(12) United States Patent
Conyers et al.

(10) Patent No.: US 12,521,542 B2
(45) Date of Patent: Jan. 13, 2026

(54) CIRCULATORY SUPPORT SYSTEM

(71) Applicant: TC1 LLC, St. Paul, MN (US)

(72) Inventors: Kevin Conyers, Pleasant Hill, CA (US); Jaime Arturo Romero, San Leandro, CA (US)

(73) Assignee: TC1 LLC, St. Paul, MN (US)

( * ) Notice: Subject to any disclaimer, the term of this patent is extended or adjusted under 35 U.S.C. 154(b) by 0 days.

(21) Appl. No.: 19/273,956

(22) Filed: Jul. 18, 2025

(65) Prior Publication Data

US 2025/0345586 A1 Nov. 13, 2025

Related U.S. Application Data

(63) Continuation of application No. 18/813,441, filed on Aug. 23, 2024, which is a continuation of application
(Continued)

(51) Int. Cl.
*A61M 60/148* (2021.01)
*A61M 60/183* (2021.01)
(Continued)

(52) U.S. Cl.
CPC ........ *A61M 60/148* (2021.01); *A61M 60/183* (2021.01); *A61M 60/508* (2021.01);
(Continued)

(58) Field of Classification Search
CPC .............. A61M 60/148; A61M 60/183; A61M 60/508; A61M 60/861; A61M 60/871; A61M 60/232; A61M 60/178
See application file for complete search history.

(56) References Cited

U.S. PATENT DOCUMENTS 845,816 A 3/1907 Prindle
888,654 A 5/1908 Prindle
(Continued)

FOREIGN PATENT DOCUMENTS

AU 2011291984 B2 8/2014
CN 300837668 S 10/2008
(Continued)

OTHER PUBLICATIONS

"Berlin Heart Incor", My LVAD, Available online At: http://www.mylvad.com/content/berlin-heart-incor, Jul. 16, 2015, 3 pages.
(Continued)

*Primary Examiner* — Jerrah Edwards
*Assistant Examiner* — Aren Patel
(74) *Attorney, Agent, or Firm* — Kilpatrick Townsend & Stockton LLP

(57) ABSTRACT

Mechanical circulatory support systems that employ a connector cable for transmitting power and data are disclosed. A mechanical circulatory support system includes a ventricular cuff, a ventricular assist device, an external module, and a connector cable. The ventricular cuff is configured for attachment to a heart. The ventricular assist device is configured for attachment to the ventricular cuff and includes a housing, a rotor, a stator assembly, and control electronics. The external module includes an internal battery and is configured to power and control operation of the mechanical circulatory support system. Power and data are transmitted from the external module to the ventricular assist device over the connector cable. The connector cable includes two redundant pairs of electrical conductors.

30 Claims, 11 Drawing Sheets

Related U.S. Application Data

No. 16/987,535, filed on Aug. 7, 2020, now Pat. No. 12,097,363, which is a continuation of application No. 15/980,441, filed on May 15, 2018, now Pat. No. 10,773,004, which is a continuation of application No. PCT/US2016/062619, filed on Nov. 17, 2016.

(60) Provisional application No. 62/258,292, filed on Nov. 20, 2015.

(51) Int. Cl.
*A61M 60/508* (2021.01)
*A61M 60/861* (2021.01)
*A61M 60/871* (2021.01)
*A61M 60/178* (2021.01)
*A61M 60/232* (2021.01)

(52) U.S. Cl.
CPC ........ *A61M 60/861* (2021.01); *A61M 60/871* (2021.01); *A61M 60/178* (2021.01); *A61M 60/232* (2021.01)

(56) References Cited

U.S. PATENT DOCUMENTS

| | | |
|---|---|---|
| 1,026,101 A | 5/1912 | Marsh |
| 2,128,988 A | 9/1938 | Christian |
| 2,747,512 A | 5/1956 | Fouche |
| 2,864,552 A | 12/1958 | Anderson |
| 3,005,117 A | 10/1961 | Buchhold |
| 3,066,849 A | 12/1962 | Beams |
| 3,122,101 A | 2/1964 | Baker et al. |
| 3,225,608 A | 12/1965 | Simon |
| 3,401,640 A | 9/1968 | John et al. |
| 3,499,274 A | 3/1970 | Fergason |
| 3,575,536 A | 4/1971 | Jacobs et al. |
| 3,597,022 A | 8/1971 | Waldron |
| 3,608,088 A | 9/1971 | Dorman et al. |
| 3,611,815 A | 10/1971 | Fischell |
| 3,647,324 A | 3/1972 | Rafferty et al. |
| 3,650,581 A | 3/1972 | Boden et al. |
| 3,882,861 A | 5/1975 | Kettering et al. |
| 3,938,913 A | 2/1976 | Isenberg et al. |
| 3,957,389 A | 5/1976 | Rafferty et al. |
| 4,082,376 A | 4/1978 | Wehde et al. |
| 4,135,253 A | 1/1979 | Reich et al. |
| 4,213,207 A | 7/1980 | Wilson |
| 4,340,260 A | 7/1982 | Forster et al. |
| 4,382,199 A | 5/1983 | Isaacson |
| 4,398,773 A | 8/1983 | Boden et al. |
| 4,405,286 A | 9/1983 | Studer |
| 4,408,966 A | 10/1983 | Maruyama |
| 4,475,866 A | 10/1984 | Kambe et al. |
| 4,507,048 A | 3/1985 | Belenger et al. |
| 4,521,871 A | 6/1985 | Galdun et al. |
| 4,589,822 A | 5/1986 | Clausen et al. |
| 4,642,036 A | 2/1987 | Young |
| 4,688,998 A | 8/1987 | Olsen et al. |
| 4,704,121 A | 11/1987 | Moise |
| 4,763,032 A | 8/1988 | Bramm et al. |
| 4,779,614 A | 10/1988 | Moise |
| 4,844,707 A | 7/1989 | Kletschka |
| 4,876,492 A | 10/1989 | Lester et al. |
| 4,878,831 A | 11/1989 | Ewing |
| 4,929,158 A | 5/1990 | Girault |
| 4,944,748 A | 7/1990 | Bramm et al. |
| 4,957,504 A | 9/1990 | Chardack |
| 5,046,965 A | 9/1991 | Neese et al. |
| 5,055,005 A | 10/1991 | Kletschka |
| 5,078,741 A | 1/1992 | Bramm et al. |
| 5,106,273 A | 4/1992 | Lemarquand et al. |
| 5,112,200 A | 5/1992 | Isaacson et al. |
| 5,112,202 A | 5/1992 | Oshima et al. |
| 5,126,612 A | 6/1992 | Girault |
| 5,127,792 A | 7/1992 | Katsuta et al. |
| 5,159,219 A | 10/1992 | Chu et al. |
| 5,177,387 A | 1/1993 | Mcmichael et al. |
| 5,195,877 A | 3/1993 | Kletschka |
| 5,220,232 A | 6/1993 | Rigney et al. |
| 5,282,757 A | 2/1994 | Maeda |
| 5,341,059 A | 8/1994 | Fukuyama et al. |
| 5,367,593 A | 11/1994 | Lebby et al. |
| 5,385,581 A | 1/1995 | Bramm et al. |
| 5,470,208 A | 11/1995 | Kletschka |
| 5,695,474 A | 12/1997 | Daugherty |
| 5,708,346 A | 1/1998 | Schob |
| 5,725,357 A | 3/1998 | Nakazeki et al. |
| 5,798,454 A | 8/1998 | Nakazeki et al. |
| 5,808,437 A | 9/1998 | Schob |
| 5,888,242 A | 3/1999 | Antaki et al. |
| 5,917,297 A | 6/1999 | Gerster et al. |
| 5,928,131 A | 7/1999 | Prem |
| 5,935,105 A | 8/1999 | Manning et al. |
| 5,991,595 A | 11/1999 | Romano et al. |
| 6,053,705 A | 4/2000 | Schob et al. |
| 6,071,093 A | 6/2000 | Hart |
| 6,100,618 A | 8/2000 | Schoeb et al. |
| 6,106,971 A | 8/2000 | Spotnitz |
| 6,116,862 A | 9/2000 | Rau et al. |
| 6,123,726 A | 9/2000 | Mori et al. |
| 6,130,494 A | 10/2000 | Schob |
| 6,146,179 A | 11/2000 | Denny et al. |
| 6,183,412 B1 | 2/2001 | Benkowski et al. |
| 6,222,290 B1 | 4/2001 | Schob et al. |
| 6,227,797 B1 | 5/2001 | Watterson et al. |
| 6,234,772 B1 | 5/2001 | Wampler et al. |
| 6,249,067 B1 | 6/2001 | Schob et al. |
| 6,264,635 B1 | 7/2001 | Wampler et al. |
| 6,278,251 B1 | 8/2001 | Schob |
| 6,293,901 B1 | 9/2001 | Prem |
| 6,302,661 B1 | 10/2001 | Khanwilkar et al. |
| 6,351,048 B1 | 2/2002 | Schob et al. |
| 6,355,998 B1 | 3/2002 | Schob et al. |
| 6,394,769 B1 | 5/2002 | Bearnson et al. |
| 6,447,266 B2 | 9/2002 | Antaki et al. |
| 6,494,736 B2 | 12/2002 | Mito |
| 6,559,567 B2 | 5/2003 | Schoeb |
| 6,592,620 B1 | 7/2003 | Lancisi et al. |
| 6,623,475 B1 | 9/2003 | Siess |
| 6,634,224 B1 | 10/2003 | Schob et al. |
| 6,640,617 B2 | 11/2003 | Schob et al. |
| 6,688,861 B2 | 2/2004 | Wampler |
| 6,711,943 B1 | 3/2004 | Schob |
| 7,070,398 B2 | 7/2006 | Olsen et al. |
| 7,112,903 B1 | 9/2006 | Schob |
| 7,131,860 B2 | 11/2006 | Sartor et al. |
| D534,548 S | 1/2007 | Urano et al. |
| 7,160,242 B2 | 1/2007 | Yanai |
| 7,229,258 B2 | 6/2007 | Wood et al. |
| 7,331,793 B2 | 2/2008 | Hernandez et al. |
| 7,338,521 B2 | 3/2008 | Antaki et al. |
| 7,340,304 B2 | 3/2008 | MacDonald et al. |
| 7,425,142 B1 | 9/2008 | Putz |
| 7,462,019 B1 | 12/2008 | Allarie et al. |
| 7,578,782 B2 | 8/2009 | Miles et al. |
| 7,658,613 B1 | 2/2010 | Griffin et al. |
| 7,699,586 B2 | 4/2010 | LaRose et al. |
| 7,861,582 B2 | 1/2011 | Miyakoshi et al. |
| 7,961,156 B2 | 6/2011 | Knott et al. |
| 7,976,271 B2 | 7/2011 | LaRose et al. |
| 7,997,854 B2 | 8/2011 | LaRose et al. |
| 8,007,254 B2 | 8/2011 | LaRose et al. |
| 8,029,441 B2 | 10/2011 | Mazza et al. |
| 8,152,493 B2 | 4/2012 | LaRose et al. |
| 8,157,720 B2 | 4/2012 | Marseille et al. |
| 8,186,665 B2 | 5/2012 | Akema |
| 8,323,174 B2 | 12/2012 | Jeevanandam et al. |
| 8,344,847 B2 | 1/2013 | Moberg et al. |
| 8,348,678 B2 | 1/2013 | Hardisty et al. |
| 8,449,444 B2 | 5/2013 | Poirier |
| 8,506,471 B2 | 8/2013 | Bourque |
| 8,562,508 B2 | 10/2013 | Dague et al. |
| 8,596,881 B2 | 12/2013 | Umeno |
| 8,597,350 B2 | 12/2013 | Rudser et al. |

(56) References Cited

U.S. PATENT DOCUMENTS

| | | | |
|---|---|---|---|
| 8,628,460 B2 | 1/2014 | Yomtov et al. | |
| 8,639,348 B2 | 1/2014 | Geheb | |
| 8,652,024 B1 | 2/2014 | Yanai et al. | |
| 8,657,733 B2 | 2/2014 | Ayre et al. | |
| 8,668,473 B2 | 3/2014 | LaRose et al. | |
| 8,684,763 B2 | 4/2014 | Mattson et al. | |
| 8,827,569 B2 | 9/2014 | Yamada | |
| 8,894,561 B2 | 11/2014 | Callaway et al. | |
| 8,971,958 B2 | 3/2015 | Frikart et al. | |
| 9,091,271 B2 | 7/2015 | Bourque | |
| 9,302,035 B2 | 4/2016 | Marseille et al. | |
| 9,308,305 B2 | 4/2016 | Chen et al. | |
| 9,526,819 B2 | 12/2016 | Chen | |
| 10,030,664 B2 | 7/2018 | Lin et al. | |
| 10,473,105 B2 | 11/2019 | Lin et al. | |
| 10,722,633 B2 | 7/2020 | Kimball et al. | |
| 10,773,004 B2 * | 9/2020 | Conyers | A61M 60/871 |
| 10,947,986 B2 | 3/2021 | Chen | |
| 11,378,090 B2 | 7/2022 | Chen | |
| 12,097,363 B2 * | 9/2024 | Conyers | A61M 60/183 |
| 2002/0007198 A1 | 1/2002 | Haupert et al. | |
| 2004/0236420 A1 | 11/2004 | Yamane et al. | |
| 2005/0004421 A1 | 1/2005 | Pacella et al. | |
| 2005/0025630 A1 | 2/2005 | Ayre et al. | |
| 2005/0071001 A1 | 3/2005 | Jarvik | |
| 2005/0147512 A1 | 7/2005 | Chen et al. | |
| 2006/0214510 A1 | 9/2006 | Patel | |
| 2007/0078293 A1 | 4/2007 | Shambaugh et al. | |
| 2007/0100196 A1 | 5/2007 | LaRose et al. | |
| 2007/0142696 A1 | 6/2007 | Crosby et al. | |
| 2008/0021394 A1 | 1/2008 | LaRose et al. | |
| 2009/0064755 A1 | 3/2009 | Fleischli et al. | |
| 2009/0118827 A1 * | 5/2009 | Sugiura | A61M 60/216 600/16 |
| 2009/0203957 A1 | 8/2009 | LaRose et al. | |
| 2009/0234447 A1 | 9/2009 | LaRose et al. | |
| 2010/0150749 A1 | 6/2010 | Horvath | |
| 2010/0152526 A1 | 6/2010 | Pacella et al. | |
| 2011/0002794 A1 | 1/2011 | Haefliger et al. | |
| 2011/0031836 A1 | 2/2011 | Nussbaumer | |
| 2011/0054239 A1 | 3/2011 | Sutton et al. | |
| 2011/0144413 A1 | 6/2011 | Foster | |
| 2011/0160516 A1 * | 6/2011 | Dague | A61M 60/508 600/16 |
| 2011/0187217 A1 | 8/2011 | Nussbaumer | |
| 2011/0218383 A1 | 9/2011 | Broen et al. | |
| 2011/0237863 A1 | 9/2011 | Ricci et al. | |
| 2011/0245582 A1 | 10/2011 | Zafirelis et al. | |
| 2012/0035411 A1 | 2/2012 | LaRose et al. | |
| 2012/0046514 A1 | 2/2012 | Bourque | |
| 2012/0059212 A1 | 3/2012 | LaRose et al. | |
| 2012/0095281 A1 | 4/2012 | Reichenbach et al. | |
| 2012/0134832 A1 | 5/2012 | Wu | |
| 2012/0157755 A1 | 6/2012 | D'ambrosio | |
| 2012/0172657 A1 | 7/2012 | Marseille et al. | |
| 2012/0183261 A1 | 7/2012 | Schwandt et al. | |
| 2012/0245680 A1 | 9/2012 | Masuzawa et al. | |
| 2012/0253103 A1 | 10/2012 | Robert | |
| 2012/0310036 A1 | 12/2012 | Peters et al. | |
| 2013/0096364 A1 | 4/2013 | Reichenbach et al. | |
| 2013/0121821 A1 | 5/2013 | Ozaki et al. | |
| 2013/0127253 A1 | 5/2013 | Stark et al. | |
| 2013/0170970 A1 | 7/2013 | Ozaki et al. | |
| 2013/0225909 A1 | 8/2013 | Dormanen et al. | |
| 2013/0314047 A1 | 11/2013 | Eagle et al. | |
| 2014/0073838 A1 | 3/2014 | Dague et al. | |
| 2014/0194985 A1 | 7/2014 | Vadala, Jr. | |
| 2014/0243970 A1 | 8/2014 | Yanai | |
| 2014/0309733 A1 | 10/2014 | Cotter | |
| 2015/0028797 A1 | 1/2015 | Miller et al. | |
| 2015/0038771 A1 | 2/2015 | Marseille et al. | |
| 2015/0120067 A1 | 4/2015 | Wing et al. | |
| 2015/0290374 A1 * | 10/2015 | Bourque | A61M 60/178 600/17 |
| 2016/0095968 A1 | 4/2016 | Rudser | |
| 2016/0175502 A1 * | 6/2016 | McSweeney | A61M 60/216 623/3.26 |
| 2018/0250459 A1 | 9/2018 | Kimball et al. | |
| 2018/0256796 A1 | 9/2018 | Hansen | |
| 2018/0256800 A1 | 9/2018 | Conyers et al. | |
| 2018/0256801 A1 | 9/2018 | Conyers et al. | |
| 2025/0065106 A1 | 2/2025 | Miao et al. | |

FOREIGN PATENT DOCUMENTS

| | | |
|---|---|---|
| CN | 106574628 B | 12/2019 |
| CN | 107073184 B | 6/2020 |
| CN | 110714926 B | 12/2021 |
| CN | 116110561 A | 5/2023 |
| CN | 116725634 A | 9/2023 |
| CN | 107091740 B | 11/2023 |
| CN | 116687531 B | 11/2023 |
| CN | 117084759 A | 11/2023 |
| CN | 220041433 U | 11/2023 |
| CN | 116604506 B | 12/2023 |
| CN | 116898536 B | 12/2023 |
| CN | 117149523 A | 12/2023 |
| CN | 117084763 B | 1/2024 |
| CN | 117122811 B | 1/2024 |
| CN | 117283266 B | 2/2024 |
| CN | 117357783 B | 2/2024 |
| CN | 117398595 B | 2/2024 |
| CN | 117353111 B | 4/2024 |
| CN | 117442865 B | 4/2024 |
| CN | 117618778 B | 4/2024 |
| CN | 117695022 B | 4/2024 |
| CN | 117691724 B | 5/2024 |
| CN | 117694977 B | 5/2024 |
| CN | 119257691 A | 1/2025 |
| CN | 119565019 A | 3/2025 |
| EP | 150320 B1 | 5/1990 |
| EP | 60569 B1 | 12/1990 |
| EP | 378251 B1 | 6/1994 |
| EP | 1812094 A0 | 5/2006 |
| EP | 2357374 A1 | 8/2011 |
| EP | 3593829 A1 | 1/2020 |
| EP | 3158203 B1 | 7/2020 |
| EP | 3157597 B1 | 11/2020 |
| EP | 3636935 B1 | 4/2024 |
| GB | 1491710 A | 11/1977 |
| HK | 40012154 A | 7/2020 |
| HK | 40015801 A | 9/2020 |
| HK | 1236594 B | 1/2021 |
| HK | 1236446 B | 4/2021 |
| HK | 40021353 B | 4/2022 |
| HK | 40015801 B | 8/2024 |
| JP | 01257792 A | 10/1989 |
| JP | 02016390 A | 1/1990 |
| JP | 03088996 A | 4/1991 |
| JP | 2000510929 A | 8/2000 |
| JP | D1373017 | 10/2009 |
| JP | 2018150942 A | 9/2018 |
| JP | 2019069225 A | 5/2019 |
| JP | 2020058861 A | 4/2020 |
| JP | 6882349 B2 | 6/2021 |
| JP | 2021121760 A | 8/2021 |
| JP | 7248723 B2 | 3/2023 |
| JP | 7478978 B2 | 5/2024 |
| TW | D136032 | 7/2010 |
| WO | 9953974 A2 | 10/1999 |
| WO | 2006/055745 A2 | 5/2006 |
| WO | 2006137496 A1 | 12/2006 |
| WO | 2010023815 A1 | 3/2010 |
| WO | 2010036815 A2 | 4/2010 |
| WO | 2010122139 A1 | 10/2010 |
| WO | 2011081626 A1 | 7/2011 |
| WO | 2012028181 A1 | 3/2012 |
| WO | 2014107424 A2 | 7/2014 |
| WO | 2015017770 A1 | 2/2015 |
| WO | 2017087380 A1 | 5/2017 |
| WO | 2017087717 A1 | 5/2017 |
| WO | 2017087785 A1 | 5/2017 |

(56) References Cited

FOREIGN PATENT DOCUMENTS

OTHER PUBLICATIONS

"The HeartMate II System", HeartMate II, Left Ventricular Assist System, Available online at: http://heartmateii.com/heartmate-ii-system.aspx, Jul. 16, 2015, 2 pages.
Barletta et al., "Design of a Bearing Less Blood Pump", Proc. Third International Symposium on Magnetic Suspension Technology, Jul. 1, 1996, pp. 265-274.

* cited by examiner

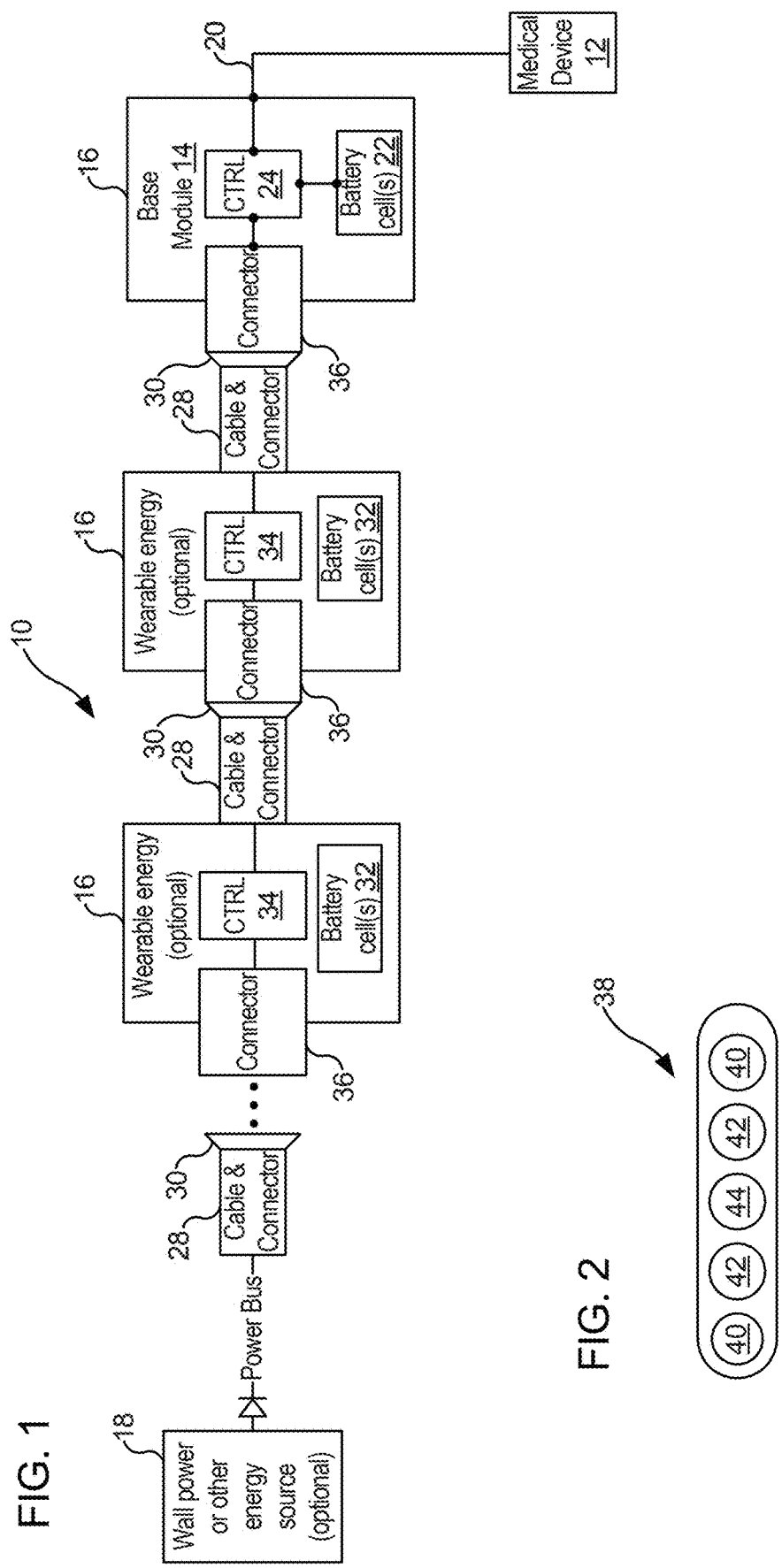

CIRCULATORY SUPPORT SYSTEM

CROSS-REFERENCE TO RELATED APPLICATION

The present application is a Continuation of U.S. patent application Ser. No. 18/813,441 filed Aug. 23, 2024; which is a Continuation of U.S. patent application Ser. No. 16/987,535 filed Aug. 7, 2020 (now U.S. Pat. No. 12,097,363); which is a Continuation of U.S. patent application Ser. No. 15/980,441 filed May 15, 2018 (now U.S. Pat. No. 10,773,004); which is a Continuation of PCT/US2016/062619 filed Nov. 17, 2016; which claims priority to U.S. Provisional Appln. No. 62/258,292 filed Nov. 20, 2015; the full disclosures which are incorporated herein by reference in their entirety for all purposes.

BACKGROUND

Ventricular assist devices, known as VADs, often include an implantable blood pump and are used for both short-term (i.e., days, months) and long-term applications (i.e., years or a lifetime) when a patient's heart is incapable of providing adequate circulation, commonly referred to as heart failure or congestive heart failure. According to the American Heart Association, more than five million Americans are living with heart failure, with about 670,000 new cases diagnosed every year. People with heart failure often have shortness of breath and fatigue. Years of living with blocked arteries and/or high blood pressure can leave a heart too weak to pump enough blood to the body. As symptoms worsen, advanced heart failure develops.

A patient suffering from heart failure may use a VAD while awaiting a heart transplant or as a long term destination therapy. A patient may also use a VAD while recovering from heart surgery. Thus, a VAD can supplement a weak heart (i.e., partial support) or can effectively replace the natural heart's function. VADs can be implanted in the patient's body and powered by an electrical power source inside or outside the patient's body.

Patients using a ventricular assist system (VAS) and their supporting caregivers or providers (hereinafter "users") can use non-implanted replenishable and/or replaceable power supplies to maintain mobility. Such non-implanted power supplies typically include battery packs and AC wall power converters. The power from these sources may be conveyed to the VAD via a VAS controller using cables. Many VAS include multiple externally worn components including the VAS controller, battery packs, and other components.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments described herein include connector assemblies for coupling externally worn components of medical systems including implanted or worn medical devices. The connector assemblies can include connector cables having a flat cross section, conductors for transferring electrical power, and/or an optical fiber for transmitting data. Connector cables having a flat cross section conform well with the body of a patient, thereby being more comfortable and inhibiting twisting of the connector cable. The conductors and the optical fiber can be arranged in a symmetrical linear array, thereby preventing misconnection via improper orientation. The connector assemblies can include sealed contacts that are easily cleaned without penetration of cleaning fluid into components of the medical system. A connector assembly can include a latching mechanism configured for secure connection of the connector assembly to a component of the medical system. One embodiment of the invention is directed to forming a system using any of the devices described herein.

Thus, in one aspect a connector assembly is provided for coupling a battery module with a medical system including an implanted or worn medical device. The connector assembly may include an input connector mounted to a housing. The input connector may include metal contact plates, may have no moving parts, and may be sealed to prevent water or dust ingression into the housing. The connector assembly may also include an output connector. The output connector may include metal pins of a complementary shape and size to the metal contact plates of the input connector so as to allow electrical connection between the input connector and the output connector. The metal pins may extend from a first end of the output connector. The output connector may also include a connector cable with electrical conductors and an optical fiber, the electrical conductors being coupled to the metal pins configured to transmit electrical power, the optical fiber being configured to transmit data. The connector cable may have a substantially flat cross-section. The output connector may also include a latching mechanism disposed at the first end of the output connector configured to physically attach the output connector to the housing.

In many embodiments of the assembly, the latching mechanism is a mechanical latching mechanism. In some embodiments of the assembly, the latching mechanism includes two latching arms, wherein each of the latching arms includes a dimple of a complementary shape and size to a respective recess on a surface of the housing.

In many embodiments of the assembly, the latching mechanism is a magnetic latching mechanism. In some embodiments of the assembly, the latching mechanism includes a first magnetic element configured to latch to a second magnetic element mounted to the housing. In some embodiments of the system, the first magnetic element is configured to unlatch from the second magnetic element upon application of a particular breakaway force.

In many embodiments of the assembly, the metal pins may be designed to avoid damaging the metal contact plates. In some embodiments of the assembly, the metal pins may include spring-loaded pins.

In many embodiments of the assembly, the electrical conductors and the optical fiber are arranged to allow increased flexibility. In some embodiments, the electrical conductors and the optical fiber are arranged in a linear array within the connector cable so that the connector cable has an elongated rectangular cross section. In some embodiments, the electrical conductors include two redundant pairs of conductors arranged symmetrically on opposite sides of the optical fiber to enable coupling of the output connector to the input connector in each of two opposite orientations.

In many embodiments of the assembly, the output connector includes multiple sets of metal pins disposed at opposite ends of the connector. In some embodiments, the output connector includes a second set of metal pins configured to electrically couple the output connector to a second input connector, wherein the second set of metal pins are coupled to the electrical conductors and extend from a second end of the output connector.

In many embodiments of the assembly, the input connector is part of a battery module. In some embodiments of the assembly, the housing is a first housing of a component of the medical system, and the battery module includes a second housing. In some embodiments, the connector cable is fixedly connected with the second housing.

In another aspect, a mechanical circulatory support system is provided. The system includes an implantable blood pump, an external controller configured to supply power to the implantable blood pump and including an external controller input connector, a battery module including a housing and one or more battery cells disposed within the housing, and a connector cable. The connector cable may be configured to removably couple the external controller input connector to the battery module, wherein the connector cable includes electrical conductors configured to transfer power from the one or more battery cells to the external controller and an optical fiber to transfer data between the external controller and the battery module.

In many embodiments of the system, the electrical conductors and optical fiber may be arranged to allow for flexibility. In some embodiments, the electrical conductors and the optical fiber are arranged in a linear array within the connector cable so that the connector cable has an elongated rectangular cross section. In some embodiments, the electrical conductors include two redundant pairs of conductors arranged symmetrically on opposite sides of the optical fiber to enable coupling of the battery module to the external controller input connector in each of two opposite orientations.

In many embodiments of the system, the external controller input connector may be designed without moving parts. In some embodiments, the external controller input connector includes metal contact plates, has no moving parts, and is sealed to prevent water or dust ingression into the external controller via the external controller input connector.

In many embodiments of the system, the metal pins may be designed to avoid damaging the metal contact plates. In some embodiments, the connector cable include spring-loaded metal pins of a complementary shape and size to the metal contact plates of the external controller input connector so as to allow electrical connection between the battery module and the external controller, wherein the metal pins extend from a first end of the connector cable.

In many embodiments of the system, the housing is a first housing, the external controller includes a second housing, and the connector cable includes a latching mechanism configured to physically attach the connector cable to the second housing. In some embodiments, the latching mechanism includes two latching arms, wherein each of the latching arms includes a dimple of a complementary shape and size to a respective recess on a surface of the second housing. In some embodiments, the latching mechanism includes a first magnetic element configured to latch to a second magnetic element mounted to the second housing. In some embodiments, the first magnetic element is configured to unlatch from the second magnetic element upon application of a particular breakaway force.

In many embodiments of the system, the connector cable is fixedly connected within the housing and extends from the housing to a battery module output connector, wherein the battery module output connector is configured to removably coupled with the external controller input connector. In some embodiments, the battery module includes a spooling assembly on which the connector cable can be spooled an unspooled to vary a length by which the connector cable extends from the housing.

In many embodiments of the system, the battery module includes a battery module output connector, and the connector cable includes a first connector at a first end configured to be removably coupled with the external controller input connector and a second connector at a second end configured to be removably coupled with the battery module output connector.

In many embodiments of the system, the battery module includes connections for receiving power from another source. In some embodiments, the battery module includes a battery module input connector configured to receive electrical power from another battery module and/or a charging unit.

In another aspect, a battery module for a medical support system including an implantable or wearable medical device is provided. The battery module includes a housing, one or more battery cells disposed within the housing, a connector cable fixedly connected with the housing and extending from the housing to a distal end of the connector cable, and a battery module output connector. The battery module output connector may be connected to the distal end of the connector cable and configured to be removably coupled with a medical device input connector operatively coupled with the medical device. The connector cable may include electrical conductors and an optical fiber, the electrical conductors configured to transfer power from the one or more battery cells to the medical device via the medical device input connector, the optical fiber being configured to transfer data between the medical device and the battery module.

In many embodiments of the battery module, the electrical conductors and optical fiber may be arranged for increased flexibility. In some embodiments of the battery module, the electrical conductors and the optical fiber are arranged in a linear array within the connector cable so that the connector cable has an elongated rectangular cross section. In some embodiments of the battery module, the electrical conductors include two redundant pairs of conductors arranged symmetrically on opposite sides of the optical fiber to enable coupling of the battery module output connector to the medical device input connector in each of two opposite orientations. In many embodiments, the battery module may include a spooling assembly on which the connector cable can be spooled and unspooled to vary a length by which the connector cable extends from the housing.

In many embodiments of the battery module, the metal pins may be designed to avoid damaging portions of the medical device. In some embodiments, the battery module output connector includes spring-loaded metal pins coupled to the electrical conductors, wherein the spring-loaded metal pins are of complementary shapes and sizes to respective metal contact plates of the medical device input connector so as to allow electrical connection between the battery module and the medical device.

In many embodiments of the battery module, the battery module output connector includes a latching mechanism configured to physically attach the battery module to a medical device housing. In some embodiments of the battery module, the latching mechanism includes two latching arms, wherein each of the latching arms includes a dimple of a complementary shape and size to a respective recess on a surface of the medical device housing. In some embodiments of the battery module, the latching mechanism includes a first magnetic element configured to latch to a second magnetic element mounted to the medical device housing. In some embodiments, the first magnetic element is configured to unlatch from the second magnetic element upon application of a particular breakaway force.

In many embodiments, the battery module includes connectors to receive electrical power from alternate sources. In some embodiments, the battery module includes a battery module input connector configured to receive electrical power from another battery module and/or a charging unit.

In another aspect, a mechanical circulatory support system is provided. The system includes an implantable blood pump, an external controller configured to supply power to the implantable blood pump and including an external controller input connector, a battery module including a housing and one or more battery cells disposed within the housing, and a connector cable. The connector cable may be configured to removably couple the external controller input connector to the battery module, wherein the connector cable includes two redundant pairs of electrical conductors configured to transfer power from the one or more battery cells to the external controller and an optical fiber to transfer data between the external controller and the battery module. The two redundant pairs of electrical conductors may be arranged symmetrically on opposite sides of the optical fiber to enable coupling of the battery module to the external controller input connector in each of two opposite orientations.

In many embodiments of the system, the electrical conductors and optical fiber may be arranged to allow for flexibility. In some embodiments, the electrical conductors and the optical fiber are arranged in a linear array within the connector cable so that the connector cable has an elongated rectangular cross section.

In many embodiments of the system, the external controller input connector may be designed without moving parts. In some embodiments, the external controller input connector includes metal contact plates, has no moving parts, and is sealed to prevent water or dust ingression into the external controller via the external controller input connector.

In many embodiments of the system, the metal pins may be designed to avoid damaging the metal contact plates. In some embodiments, the connector cable include spring-loaded metal pins of a complementary shape and size to the metal contact plates of the external controller input connector so as to allow electrical connection between the battery module and the external controller, wherein the metal pins extend from a first end of the connector cable.

In many embodiments of the system, the housing is a first housing, the external controller includes a second housing, and the connector cable includes a latching mechanism configured to physically attach the connector cable to the second housing. In some embodiments, the latching mechanism includes two latching arms, wherein each of the latching arms includes a dimple of a complementary shape and size to a respective recess on a surface of the second housing. In some embodiments, the latching mechanism includes a first magnetic element configured to latch to a second magnetic element mounted to the second housing. In some embodiments, the first magnetic element is configured to unlatch from the second magnetic element upon application of a particular breakaway force.

In many embodiments of the system, the connector cable is fixedly connected within the housing and extends from the housing to a battery module output connector, wherein the battery module output connector is configured to be removably coupled with the external controller input connector. In some embodiments, the battery module includes a spooling assembly on which the connector cable can be spooled an unspooled to vary a length by which the connector cable extends from the housing.

In many embodiments of the system, the battery module includes a battery module output connector, and the connector cable includes a first connector at a first end configured to be removably coupled with the external controller input connector and a second connector at a second end configured to be removably coupled with the battery module output connector.

In many embodiments of the system, the battery module includes connections for receiving power from another source. In some embodiments, the battery module includes a battery module input connector configured to receive electrical power from another battery module and/or a charging unit.

In still another aspect, a method is provided for coupling a battery module to a medical support system including an implantable or wearable medical device. The battery module may include a first housing, one or more battery cells disposed within the first housing, a connector cable fixedly connected with the first housing and extending from the first housing to a distal end of the connector cable, the connector cable including electrical conductors and an optical fiber, and a battery module output connector connected to the distal end of the connector cable. The method may include electrically connecting metal pins of the battery module output connector to metal contact plates of an input connector of the medical support system so as to allow transfer of power from the one or more battery cells to the medical support system, wherein the input connector is mounted to a second housing of the medical support system, has no moving parts, and is sealed to prevent water or dust ingression into the second housing. The method may further include optically connecting the optical fiber to an optical connection of the input connector of the medical support system so as to allow transmission of data between the battery module and the medical support system. The method may further include latching the battery module output connector to the second housing of the medical device so as to physically connect the battery module to the medical support system.

In many embodiments of the method, latching the battery module output connector to the second housing comprises mechanical latching. In some embodiments, latching the battery module output connector to the second housing comprises mating dimples of two latching arms of the battery module output connector to recesses on surfaces of the second housing having complementary shapes and sizes to the dimples.

In many embodiments of the method, latching the battery module output connector to the second housing comprises magnetic latching. In some embodiments, latching the battery module output connector to the second housing comprises magnetically latching the battery module output connector to the second housing. In some embodiments, the method further includes applying a particular force to unlatch the battery module output connector from the second housing.

In many embodiments of the method, the metal pins comprise spring-loaded pins. In some embodiments, electrically connecting the metal pins to the metal contact plates comprises pressing the spring-loaded pins against the metal plates.

In many embodiments of the method, the electrical conductors include two redundant pairs of conductors arranged symmetrically on opposite sides of the optical fiber to enable coupling of the battery module output connector to the input connector in each of two opposite orientations. In some embodiments, each of the electrically connecting, optically connecting, and latching may occur in each of the two opposite orientations.

In many embodiments of the method, the medical support system includes an implantable blood pump. In some embodiments, the medical support system includes an implantable blood pump and an external controller configured to supply power to the implantable blood pump, the external controller including the second housing and the input connector.

In many embodiments of the method, the battery module includes a battery module input connector configured to receive electrical power from an additional battery module. In some embodiments, the method further includes electrically connecting the additional battery module to the battery module via the battery module input connector.

In one general aspect, an implantable blood pump includes a housing and a blood flow conduit. Within the housing, the blood pump includes a stator located about the blood flow conduit and a magnetically-levitated rotor.

In another general aspect, an implantable blood pump includes a housing defining an inlet opening and an outlet opening. Within the housing, a dividing wall defines a blood flow conduit extending between the inlet opening and the outlet opening of the housing. The blood pump has a rotary motor that includes a stator and a rotor. The stator is disposed within the housing circumferentially about the dividing wall such that the inner blood flow conduit extends through the stator.

In another general aspect, an implantable blood pump includes a puck-shaped housing having a first face defining an inlet opening, a peripheral sidewall, and a second face opposing the first face. The blood pump has an internal dividing wall defining an inner blood flow conduit extending between the inlet opening and an outlet opening of the housing. The puck-shaped housing has a thickness from the first face to the second face that is less than a width of the housing between opposing portions of the peripheral sidewall. The blood pump also has a motor having a stator and a rotor. The stator is disposed in the housing circumferentially about the blood flow conduit and includes magnetic levitation components operable to control an axial position and a radial position of the rotor. The rotor is disposed in the inner blood flow conduit and includes an impeller operable to pump blood from the inlet opening to the outlet opening through at least a portion of the magnetic levitation components of the stator.

Implementations of the above aspects may include one or more of the following features. For example, the stator is disposed circumferentially about at least a part of the rotor and is positioned relative to the rotor such that in use blood flows within the blood flow conduit through the stator before reaching the rotor. The rotor has permanent magnetic poles for magnetic levitation of the rotor. A passive magnetic control system is configured to control an axial position of the rotor relative to the stator, and an active electromagnetic control system is configured to radially center the rotor within the inner blood flow conduit. An electromagnetic control system controls at least one of a radial position and an axial position of the rotor relative to the stator, and the electromagnetic control system has control electronics located within the housing about the dividing wall.

The control electronics are located between the inlet opening and the stator. The control electronics can be configured to control the active magnetic control system. The rotor has only one magnetic moment. The stator includes a first coil for driving the rotor and a second coil for controlling a radial position of the rotor, and the first coil and the second coil are wound around a first pole piece of the stator. The housing has a first face that defines the inlet opening, a second face opposing the first face, and a peripheral wall extending from the first face to the second face. The housing includes a rounded transition from the second face to the peripheral wall. The housing defines a volute located such that in use blood flows within the blood flow conduit through the stator before reaching the volute. The volute can be located between the stator and the second face. The housing can also include a cap that includes the second face, defines at least part of the volute, and defines at least part of the outlet. The cap is engaged with the peripheral wall of the housing. The housing also includes an inlet cannula extending from the first face and in fluid communication with the inlet opening. The inlet cannula can be inserted into the patient's heart. The outlet opening is defined in the second face and/or the peripheral wall. A thickness of the housing between the first face and the second face is less than a width of the housing.

In another general aspect, a method includes inserting a puck-shaped blood pump housing into a patient's body. The blood pump is inserted such that an opening defined in a first flat face of the housing that is proximate to a stator of the blood pump faces the patient's heart. Additionally, the blood pump is inserted such that a second rounded face of the housing that is proximate to an impeller of the blood pump faces away from the patient's heart. The first face is disposed against a portion of the patient's heart such that the second face of the housing faces away from the heart of the patient. In some implementations, the method includes inserting an inlet cannula of the housing into the patient's heart.

In another general aspect, making a blood pump includes assembling a motor stator and control electronics in a puck-shaped housing circumferentially about an internal dividing wall. The internal dividing wall defines an inner blood flow conduit that extends from an inlet opening to an outlet opening of the housing. The stator is assembled in the housing such that the inner blood flow conduit extends through the motor stator. Disposed within the inner blood flow conduit is a magnetically-levitated rotor. The rotor is surrounded by the stator such that impeller blades carried by the rotor are downstream of the stator from the inlet opening. In use, the impeller pumps blood from the inlet opening to the outlet opening through the stator.

Implementations may include one or more of the following features. For example, the rotor has only one magnetic moment. The stator includes at least one first coil for driving the rotor and at least one second coil for controlling a radial position of the rotor, the at least one first coil and the at least one second coil being wound around a first pole piece of the stator. The housing includes a first face that defines the inlet opening, and further comprising engaging an end cap with a peripheral wall of the housing, the end cap including a second face, defining at least part of a volute, and defining at least part of the outlet opening. The housing includes a rounded transition from the second face to the peripheral wall. The housing further includes an inlet cannula extending from the first face and in fluid communication with the inlet opening. A thickness of the housing between the first face and the second face is less than a width of the housing.

In another general aspect, a method of pumping blood includes magnetically rotating a centrifugal pump impeller of a blood pump device to draw blood from a patient's heart through an inlet opening of a housing of the blood pump device into an inner blood flow conduit within a stator in the housing, through the inner blood flow conduit, and through an outlet opening of the housing. The method includes selectively controlling a radial position of the impeller within the inner blood flow conduit.

The details of one or more implementations are set forth in the accompanying drawings and the description below. Other features will be apparent from the description and drawings, and from the claims.

BRIEF DESCRIPTION OF THE DRAWINGS

FIG. 1 is a simplified schematic diagram illustrating a system for supplying power to a medical device worn by a user or implanted in the user, in accordance with many embodiments.

FIG. 2 illustrates a cross-section of a connector, in accordance with many embodiments.

DETAILED DESCRIPTION

Figure 3:
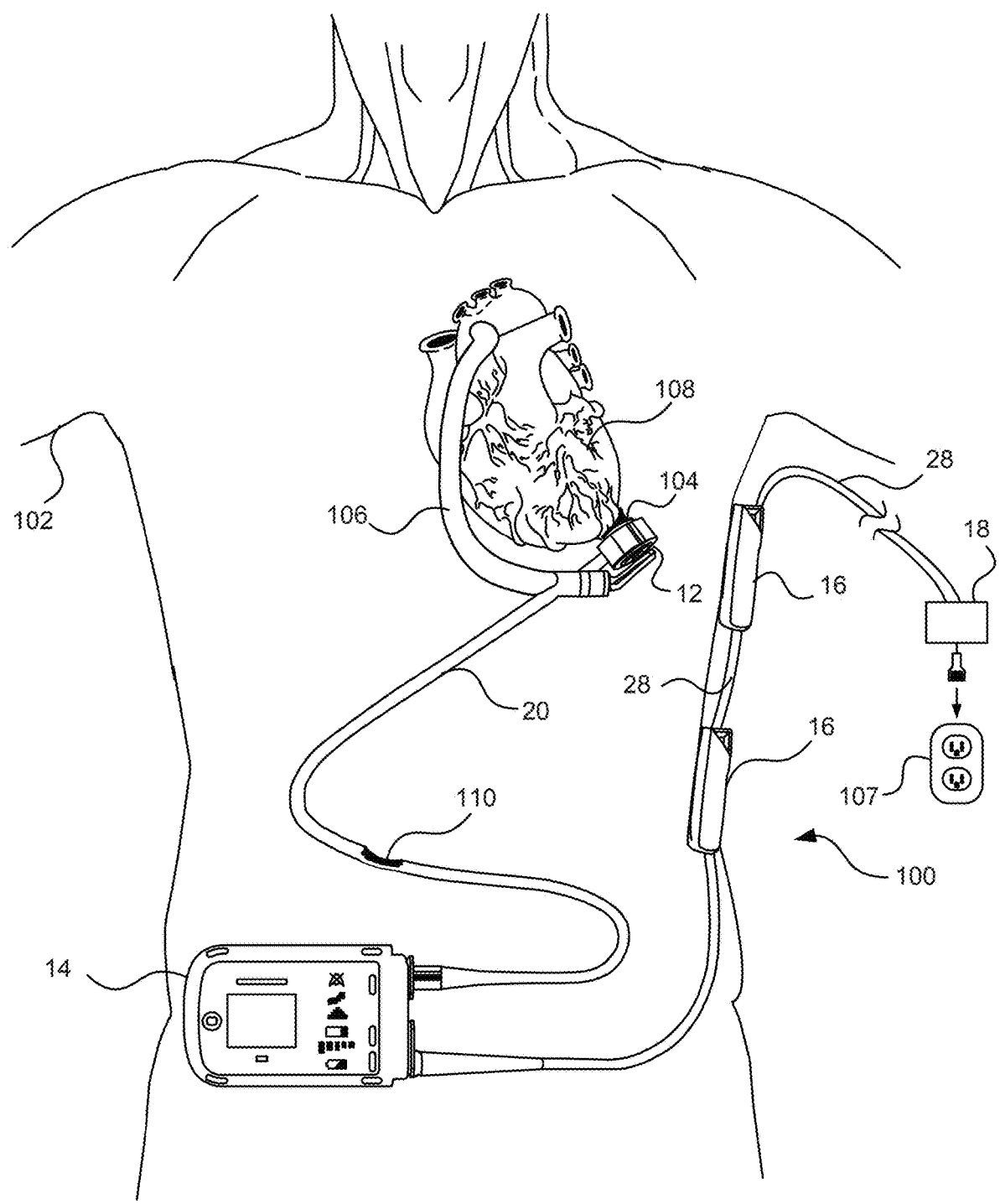
FIG. 3 illustrates an example medical device system that employs the system of FIG. 1.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Referring now to the drawings, in which like reference numerals represent like parts throughout the several views, FIG. 1 shows a system 10, in accordance with many embodiments, for supplying power to a medical device worn by a user or implanted in the user. The system 10 includes a wearable or implantable medical device 12, a base module 14, a plurality of external battery modules 16, and a non-worn energy source 18. The external battery modules 16 are configured for selective serial connection to enable the connection of any suitable number of the external battery modules 16 to the base module 14 to vary the total battery capacity worn by the user. The non-worn energy source 18 can be any suitable energy source, for example, a wall power unit configured to convert utility power (e.g., 110 volt AC power) to direct current having a voltage level compatible with the external battery modules 16 and the base module 14. The non-worn energy source 18 can be selectively and intermittently connected to the most distal external battery module 16 to supply electrical power used to recharge the external battery modules 16, recharge the base module 14, and/or be output to the medical device 12 via a connection line 20.

The base module 14 is configured to supply operating electrical power to the medical device 12 via the connection line 20. The base module 14 includes one or more base module battery cells 22, a base module controller 24, and a base module input connector 26. The base module controller 24 is configured to supply power to the medical device 12 output by the one or more base module battery cells 22 and/or received via the base module input connector 26. In many embodiments, the base module controller 24 includes an integrated charger for recharging the one or more base module battery cells 22 via electrical power received via the base module input connector 26. In many embodiments, the base module controller 24 is configured to detect when at least one external battery module 16 or the non-worn energy source 18 is connected to the base module input connector 26. For example, the base module input connector 26 can include a data connection to receive a signal when at least one external battery module 16 or the non-worn energy source 18 is connected to the base module input connector 26. Alternatively, the base module controller 24 can be configured to detect when a suitable voltage potential is applied to the base module input connector 26 indicative of at least one external battery module 16 or the non-worn energy source 18 being connected to the base module input connector 26. When the connection of at least one of the external battery modules 16 or the non-worn energy source 18 to the base module input connector 26 is detected, the base module controller 24 can supply electrical power to the medical device solely via electrical power received via the base module input connector 26 and can simultaneously recharge the one or more base module battery cells 22 via electrical power received via the base module input connector 26 if the one or more base module battery cells 22 are not already fully charged. When the base module controller 24 does not detect the connection of any power source to the base module input connector 24, the base module controller 24 is configured to supply electrical power to the medical device 12 via electrical power from the one or more base module battery cells 22.

In the illustrated embodiment, each of the external battery modules 16 includes an output cable 28, an output connector 30, one or more external battery cells 32, an external battery controller 34, and an input connector 36. The external battery controller 34 is configured to supply power via the output connector 30 output by the one or more external battery cells 32 and/or received via the input connector 36. In many embodiments, the external battery controller 34 includes an integrated charger for recharging the one or more external battery cells 32 via electrical power received via the input connector 36. In many embodiments, the external battery controller 34 is configured to detect when at least one external battery module 16 or the non-worn energy source 18 is connected to the input connector 36. For example, the input connector 36 can include a data connection to receive a signal when at least one external battery module 16 or the non-worn energy source 18 is connected to the input connector 26. Alternatively, the external battery controller 34 can be configured to detect when a suitable voltage potential is applied to the input connector 36 indicative of at least one external battery module 16 or the non-worn energy source 18 being connected to the input connector 36. When the connection of at least one of the external battery modules 16 or the non-worn energy source 18 to the input connector 36 is detected, the external battery controller 34 can supply electrical power via the output connector 30 via electrical power received via the input connector 36 and can simultaneously recharge the one or more external battery cells 32 via electrical power received via the input connector 36 if the one or more external battery cells 32 are not already fully charged. When the external battery controller 34 does not detect the connection of any power source to the input connector 34, the external battery controller 34 is configured to output electrical power via the output connector 30 via electrical power from the one or more external battery cells 32.

Any suitable serial combination of the external battery modules 16 can be used. For example, zero, one, two, three, four, or greater of the external battery modules 16 can be serially connected to the base module 14 to supply power to the base module 14 for supply to the medical device 12. Additionally, in many embodiments, the non-worn power source 18 can be connected directly to the base module 14 to supply electrical power that can be used by the base module 14 to supply electrical power to the medical device 12 and to recharge the one or more base module battery cells 22 if the one or more base module battery cells 22 are not already fully charged. While the external battery modules 16 are configured to be serially connected physically, the external battery modules 16 are configured so as to be connected in parallel electrically so as to not vary the voltage supplied to the base module 14.

FIG. 2 shows a connector arrangement 38 that can be used in the base module input connector 26, the output connector 30, and the input connector 36. The connector arrangement 38 includes two first power connectors 40, two second power connectors 42, and a data connector 44. The first and the second connectors 40, 42 are used to transfer power. For example, each of the first connectors 40 can be electrically connected to a power lead and each of the second connectors 42 can be electrically connected to a ground lead, and vice-versa. The data connector 44 is used to connect data lines to transmit data between the base module controller 24 and the one or more external battery controllers 34 and/or between any of the one or more external battery controllers 34. The symmetrical arrangement of the connectors 40, 42, 44 accommodates connection of the connector arrangement 38 in opposite orientations, thereby accommodating proper connection in either of the two possible orientations between connectors.

The system 10 can be employed in any suitable medical system (e.g., a worn or at least partially implanted medical system). For example, FIG. 3 illustrates a mechanical circulatory support system 100 that employs the system 10. The mechanical circulatory support system 100 includes an implantable blood pump assembly (i.e., medical device 12) implanted in a patient 102, a ventricular cuff 104, an outflow cannula 106, and an external system controller (base module 14). In the illustrated configuration, two of the external battery modules 16 are shown serially connected to the external system controller 14. As described herein, however, any suitable number of the external battery modules 16 and/or the non-worn energy source 18 (e.g., that can be powered via being plugged into an outlet 107) can be coupled with the external system controller 14 to supply power to the external system controller 14 for supply to the blood pump assembly 12. The blood pump assembly 12 can include a VAD that is attached to an apex of the left ventricle, as illustrated, or the right ventricle, or both ventricles of the patient's heart 108. The VAD can include a centrifugal pump (as shown) that is capable of pumping the entire output delivered to the left ventricle from the pulmonary circulation (i.e., up to 10 liters per minute). Related blood pumps applicable to the present invention are described in greater detail below and in U.S. Pat. Nos. 5,695,471, 6,071,093, 6,116,862, 6,186,665, 6,234,772, 6,264,635, 6,688,861, 7,699,586, 7,976,271, 7,997,854, 8,007,254, 8,152,493, 8,652,024, and 8,668,473 and U.S. Patent Publication Nos. 2007/0078293, 2008/0021394, 2009/0203957, 2012/0046514, 2012/0095281, 2013/0096364, 2013/0170970, 2013/0121821, and 2013/0225909, all of which are incorporated herein by reference for all purposes in their entirety. The blood pump assembly 12 can be attached to the heart 108 via the ventricular cuff 104, which can be sewn to the heart 108 and coupled to the blood pump 12. The other end of the blood pump 12 connects to the ascending aorta via the outflow cannula 106 so that the VAD effectively diverts blood from the weakened ventricle and propels it to the aorta for circulation through the rest of the patient's vascular system.

FIG. 3 illustrates the mechanical circulatory support system 100 during battery powered operation by the system 10 via the two connected external battery modules 16. A driveline (connection line 20) that exits through the patient's abdomen 110 connects the implanted blood pump assembly 12 to the external system controller 14, which monitors system 100 operation. Related controller systems applicable to the present invention are described in greater detail below and in U.S. Pat. Nos. 5,888,242, 6,991,595, 8,323,174, 8,449,444, 8,506,471, 8,597,350, and 8,657,733, EP 1812094, and U.S. Patent Publication Nos. 2005/0071001 and 2013/0314047, all of which are incorporated herein by reference for all purposes in their entirety. As described herein the power system 10 used to power the system 100 can include any suitable combination (zero, one, two, three, four, or more) of the external battery modules 16 and/or the non-worn power source 18.

Figure 4:
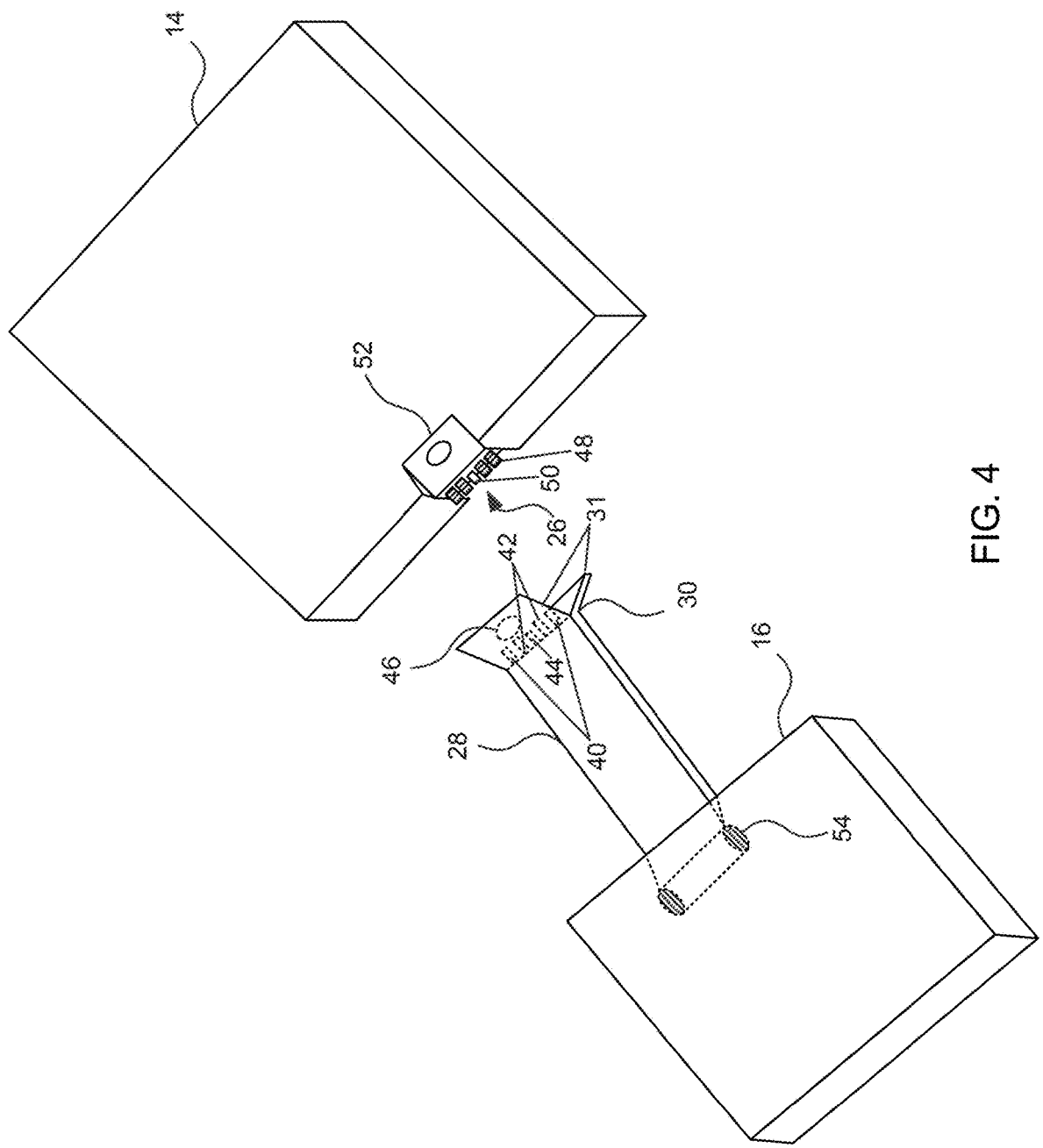
FIG. 4 illustrates a battery module that includes a connector assembly having a mechanical latching mechanism, in accordance with many embodiments.

FIG. 4 illustrates a battery module with a connector assembly, in accordance with many embodiments. Although not shown in FIG. 4, as described above with respect to FIG. 1, the battery module 16 can include one or more battery cells disposed within its housing that may provide electrical power to a medical system including an implanted or worn medical device. For example, the battery cells of the battery module 16 can provide electrical power to an external controller 14, which is configured to supply power to a medical device such as an implantable blood pump.

As shown in FIG. 4, the battery module 16 includes a connector cable 28 fixedly connected with the housing and extending from the housing to a distal end of connector cable 28. The connector cable 28 includes electrical conductors 40 and 42 configured to transfer power from the one or more battery cells and an optical fiber 44 to transfer data. The battery module 16 further includes a battery module output connector 30 connected to the distal end of the connector cable and configured to be removably coupled with an input connector 26 mounted on the external controller 14. The input connector 26 includes metal contact plates 48 that couple with exposed ends of the electrical conductors 40 and 42 and an optical connector 50 that couples with the optical fiber 44. In many presently preferred embodiments, the input connector 26 does not include any moving parts, and can be sealed to prevent water or dust ingression into the housing of the external controller 14.

The exposed ends of the electrical conductors 40 and 42 can include spring-loaded metal pins coupled to the electrical conductors. In some embodiments, the spring-loaded metal pins are of complementary shapes and sizes to the respective metal contact plates 48 of the medical device input connector 26 so as to allow electrical connection between the battery module 16 and the external controller 14. The use of spring-loaded metal pins to couple with the metal contact plates 48 may avoid damaging the pins during mating of connector cable 28 with input connector 26.

While the above-mentioned features of battery module output connector 30 and input connector 26 allow for electrical and optical coupling of electrical conductors 40, 42 and optical fiber 44 with the external controller 14 in order to transmit electrical power and data, in many embodiments the battery module 16 is physically coupled to external controller 14 so that the electrical and optical connections remain securely coupled. Accordingly, in many embodiments, the battery module output connector 30 also includes a latching mechanism 31. In some embodiments, the latching mechanism 31 includes two latching arms 31. Each of the latching arm 31 can include a dimple 46 on the outer surface of the latching arm and a corresponding protrusion on the inner surface of the latching arm. The protruding portion of each dimple 46 can have a complementary shape and size to a respective recesses 52 on the housing of external controller 14, so that latching arm 31 is configured to mate with the recess 52. In some embodiments, the recesses 52 may be sized to allow a snap fit connection with the dimples 46 of latching arms 31. Although only shown on the top surface of the housing of external controller 14, an additional recess 52 can be disposed on the bottom surface of the housing of the external controller 14 so as to mate with the bottom latching arm 31.

As described above with respect to FIG. 2, the electrical conductors 40, 42 and the optical fiber 44 can be arranged in a linear array within the connector cable 28 so that the connector cable 28 has an elongated rectangular cross section. The elongated rectangular or flat nature of the cross section may allow connector cable 28 to easily conform to a patient's body without excessive twisting and/or tangling of the cable. As also described above with respect to FIG. 2, the two pairs of electrical conductors 40, 42 can be arranged symmetrically on opposite sides of optical fiber 44 to enable coupling of the battery module output connector 30 to the input connector 26 in each of two opposite orientations.

The battery module 16 can include a spooling assembly 54 disposed within its housing, on which the connector cable can be spooled and unspooled. The spooling assembly 54 may allow a patient or other user to vary the length by which the connector cable 28 extends from the housing. In some embodiments, the spooling assembly 54 is spring loaded and configured to allow for locking of the connector cable at a desired length and to allow for selective retraction of the connector cable.

Figure 5:
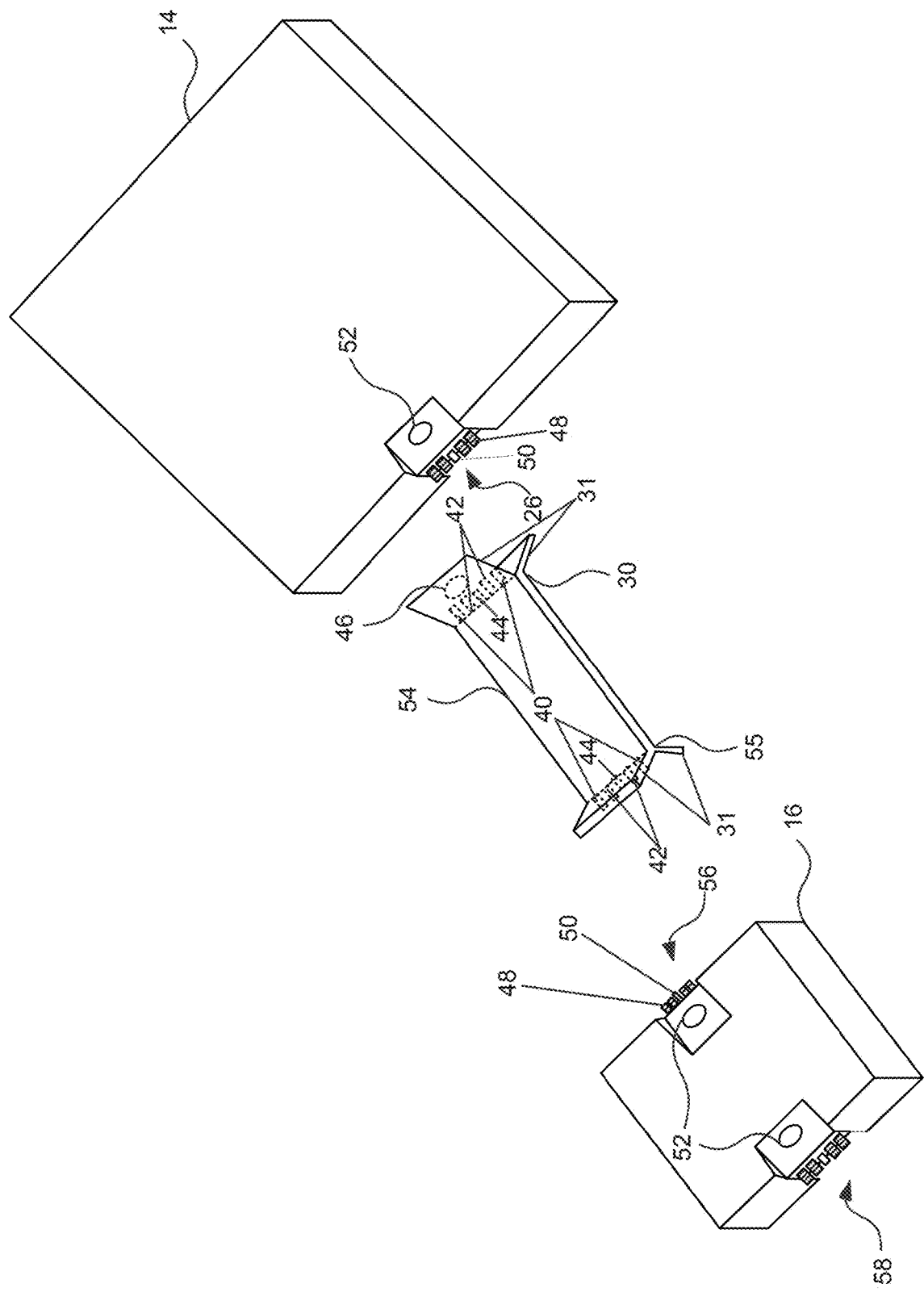
FIG. 5 illustrates a connector assembly that includes mechanical latching mechanisms, in accordance with many embodiments.

FIG. 5 illustrates a connector assembly, in accordance with many embodiments. The connector assembly includes a connector 54 that operates similarly to connector cable 28 and battery module output connector 30, except that connector 54 is decouplable from the battery module 16. The connector 54 is a separate component that is configured to removably couple to either or both of the external controller 14 and/or the battery module 16. The connector 54 includes a first connecting end 30 similar to battery module output connector 30 described above with respect to FIG. 4. The connector 54 includes the electrical conductors 40, 42 and an optical fiber 44. The output connector 30 is configured to couple to the metal contacts 48 and optical connector 50 of input connector 26 mounted to external controller 14. As described above, the electrical conductors 40, 42 can be coupled with spring-loaded pins configured to electrically couple with the metal contacts 48. The connector 54 includes a first set of latching arms 31 with dimples 46, similar to latching arms 31 described in FIG. 4, which mechanically latch the connector 54 to the recesses 52 on the external controller 14.

At the opposite end of the first connecting end 30, the connector 54 include a second connecting end 55 for coupling with an output connector 56 of the battery module 16. Although not shown in FIG. 5, the connecting end 55 may also be used to couple the connector 54 to the external controller 14 or another external controller configured similar thereto. The output connector 56 can include metal contacts 48 and an optical connector 50 similar to the input connector 26 of the external controller 14. The second connecting end 55 can include additional spring-loaded contacts connected to the electrical conductors 40, 42 and an optical connector coupled to the optical fiber 44. As described above, the electrical conductors 40 and 42 can be connected to spring-loaded pins that allow for electrical connection between the connector 54 and the output connector 56 of the battery module 16. The second connecting end 55 can include a second pair of latching arms 31 with dimples 46 (not shown). The dimples 46 on the latching arms 31 at second connecting end 55 can be configured to latch to the recesses 52 on surfaces of the battery module 16 as described above. The recesses 52 on the battery module 16 can be the same size and shape as the recesses 52 on the external controller 14, to allow a snap fit connection with the dimples 46 of the latching arms 31.

As shown in FIG. 5, the battery module 16 can optionally include an input connector 58 for receiving electrical power from another battery module 16, a non-wearable power source 18, or any other suitable power source. As can be seen in FIG. 5, the input connector 58 can include metal contacts 48 and optical connector 50 similar to that of the output connector 56 and the input connector 26. The housing of battery module 16 can also include another pair of recesses 52 similar to previously described recesses 52. In this way, each of the input connector 58, the output connector 56, and the input connector 26 can be connected with any given connecting end of the connector 54.

As described above with respect to the connector cable 28 of FIG. 4, the body of the connector 54 can have an elongated rectangular or flat cross section that may allow connector 54 to conform with a patient's body without excessive twisting and/or tangling of the cable. As also described above with respect to FIG. 2, the two pairs of electrical conductors 40, 42 can be arranged symmetrically on opposite sides of the optical fiber 44 to enable coupling of the battery module output connector 30 to the input connector 26 in each of two opposite orientations, allowing for flexibility and ease of use in connecting and disconnecting battery modules and/or external controllers.

Figure 6:
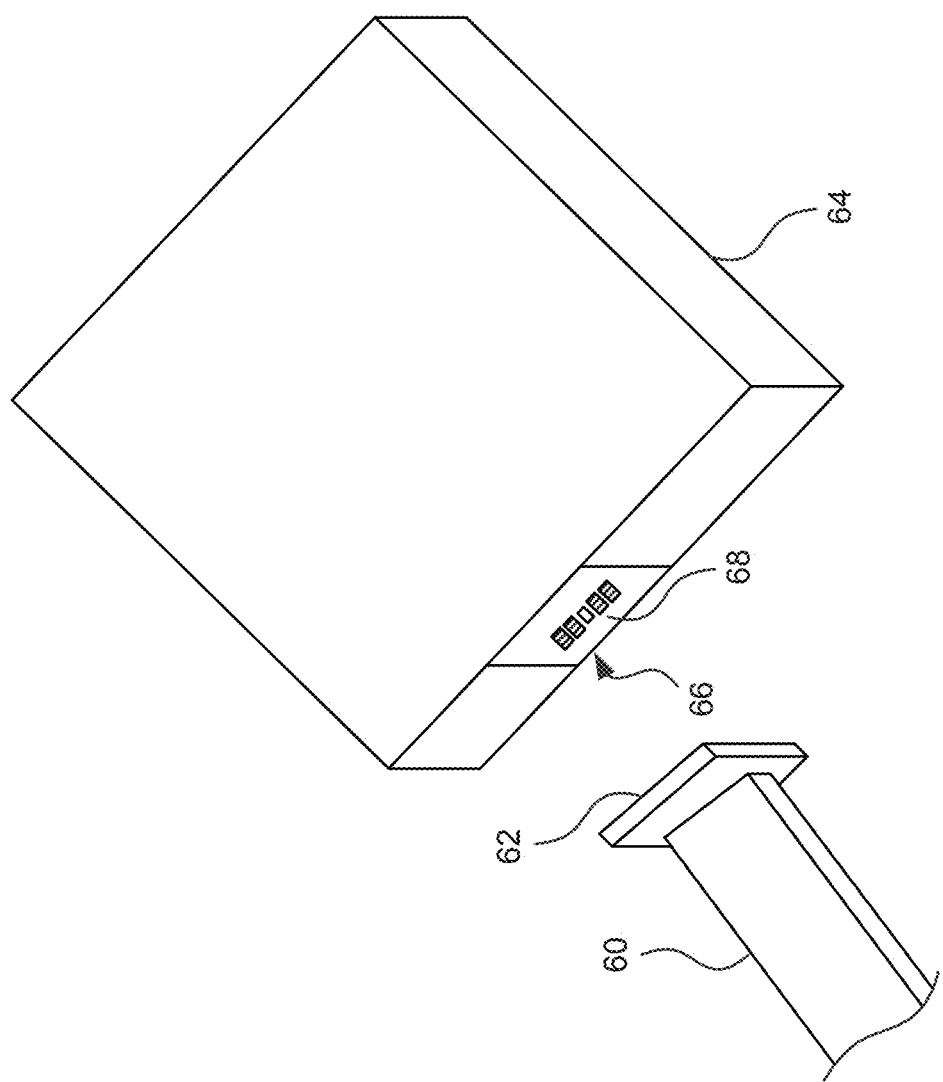
FIG. 6 illustrates a connector assembly that includes a magnetic latching mechanism, in accordance with many embodiments.

FIG. 6 illustrates a connector assembly with a magnetic latching mechanism, in accordance with many embodiments. Although not shown in detail, a connector 60 can include the components and arrangement of the connector cable 28, the output connector 30, and/or the connector 54 described above, except rather than latching arms 31, the connector 60 includes a magnetic latching mechanism. Specifically, at one or both ends of the connector 60, a first magnetic element 62 can be provided. In some embodiments, the magnet element 62 includes recesses in order to expose electrical conductors and/or optical fibers of the connector 60. In order to latch the connector 60 to the component 64 (which may be a battery, an external controller, or any other worn component in a medical device as described above), the input connector 66 can include a second magnetic element 68 that magnetically attracts the first magnetic element 62.

The first magnetic element 62 and the second magnetic element 66 can be designed to unlatch upon application of a particular breakaway force in some embodiments. In some embodiments, the particular breakaway force corresponds to a moderate pulling by the patient on the connector 60. In some presently preferred embodiments, the first magnetic element 62 and second magnetic element 66 can unlatch in response to a force resulting from a component coupled to the opposite side of the connector 60 being released from a supporting holster on the patient's body so as to avoid damage to the component 64.

With reference to FIGS. 7 and 10-17, a left ventricular assist blood pump 100 having a puck-shaped housing 110 is implanted in a patient's body with a first face 111 of the housing 110 positioned against the patient's heart H and a second face 113 of the housing 110 facing away from the heart H. The first face 111 of the housing 110 includes an inlet cannula 112 extending into the left ventricle LV of the heart H. The second face 113 of the housing 110 has a chamfered edge 114 to avoid irritating other tissue that may come into contact with the blood pump 100, such as the patient's diaphragm. To construct the illustrated shape of the puck-shaped housing 110 in a compact form, a stator 120 and electronics 130 of the pump 100 are positioned on the inflow side of the housing toward first face 111, and a rotor 140 of the pump 100 is positioned along the second face 113. This positioning of the stator 120, electronics 130, and rotor 140 permits the edge 114 to be chamfered along the contour of the rotor 140, as illustrated in at least FIGS. 8, 10, and 12-15, for example.

Figure 8:
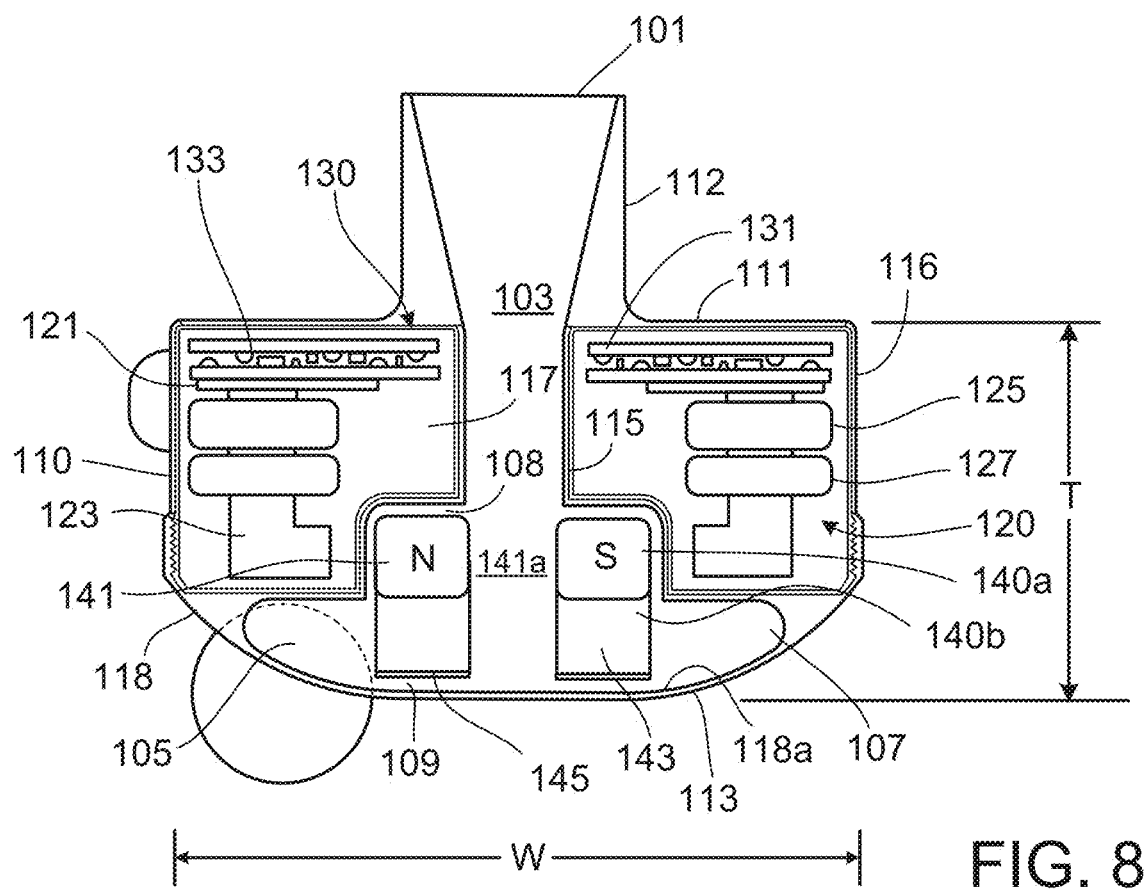
FIG. 8 is a cross-sectional view of the blood pump of FIG. 7.

Referring to FIG. 8, the blood pump 100 includes a dividing wall 115 within the housing 110 defining a blood flow conduit 103. The blood flow conduit 103 extends from an inlet opening 101 of the inlet cannula 112 through the stator 120 to an outlet opening 105 defined by the housing 110. The rotor 140 is positioned within the blood flow conduit 103. The stator 120 is disposed circumferentially about a first portion 140a of the rotor 140, for example about a permanent magnet 141. The stator 120 is also positioned relative to the rotor 140 such that, in use, blood flows within the blood flow conduit 103 through the stator 120 before reaching the rotor 140. The permanent magnet 141 has a permanent magnetic north pole N and a permanent magnetic south pole S for combined active and passive magnetic levitation of the rotor 140 and for rotation of the rotor 140. The rotor 140 also has a second portion 140b that includes impeller blades 143. The impeller blades 143 are located within a volute 107 of the blood flow conduit such that the impeller blades 143 are located proximate to the second face 113 of the housing 110.

The puck-shaped housing 110 further includes a peripheral wall 116 that extends between the first face 111 and a removable cap 118. As illustrated, the peripheral wall 116 is formed as a hollow circular cylinder having a width W between opposing portions of the peripheral wall 116. The housing 110 also has a thickness T between the first face 111 and the second face 113 that is less than the width W. The thickness T is from about 0.5 inches to about 1.5 inches, and the width W is from about 1 inch to about 4 inches. For example, the width W can be approximately 2 inches, and the thickness T can be approximately 1 inch.

The peripheral wall 116 encloses an internal compartment 117 that surrounds the dividing wall 115 and the blood flow conduit 103, with the stator 120 and the electronics 130 disposed in the internal compartment 117 about the dividing wall 115. The removable cap 118 includes the second face 113, the chamfered edge 114, and defines the outlet opening 105. The cap 118 can be threadably engaged with the peripheral wall 116 to seal the cap 118 in engagement with the peripheral wall 116. The cap 118 includes an inner surface 118a of the cap 118 that defines the volute 107 that is in fluid communication with the outlet opening 105.

Within the internal compartment 117, the electronics 130 are positioned adjacent to the first face 111 and the stator 120 is positioned adjacent to the electronics 130 on an opposite side of the electronics 130 from the first face 111. The electronics 130 include circuit boards 131 and various components 133 carried on the circuit boards 131 to control the operation of the pump 100 by controlling the electrical supply to the stator 120. The housing 110 is configured to receive the circuit boards 131 within the internal compartment 117 generally parallel to the first face 111 for efficient use of the space within the internal compartment 117. The circuit boards also extend radially-inward towards the dividing wall 115 and radially-outward towards the peripheral wall 116. For example, the internal compartment 117 is generally sized no larger than necessary to accommodate the circuit boards 131, and space for heat dissipation, material expansion, potting materials, and/or other elements used in installing the circuit boards 131. Thus, the external shape of the housing 110 proximate the first face 111 generally fits the shape of the circuits boards 131 closely to provide external dimensions that are not much greater than the dimensions of the circuit boards 131.

Figure 9:
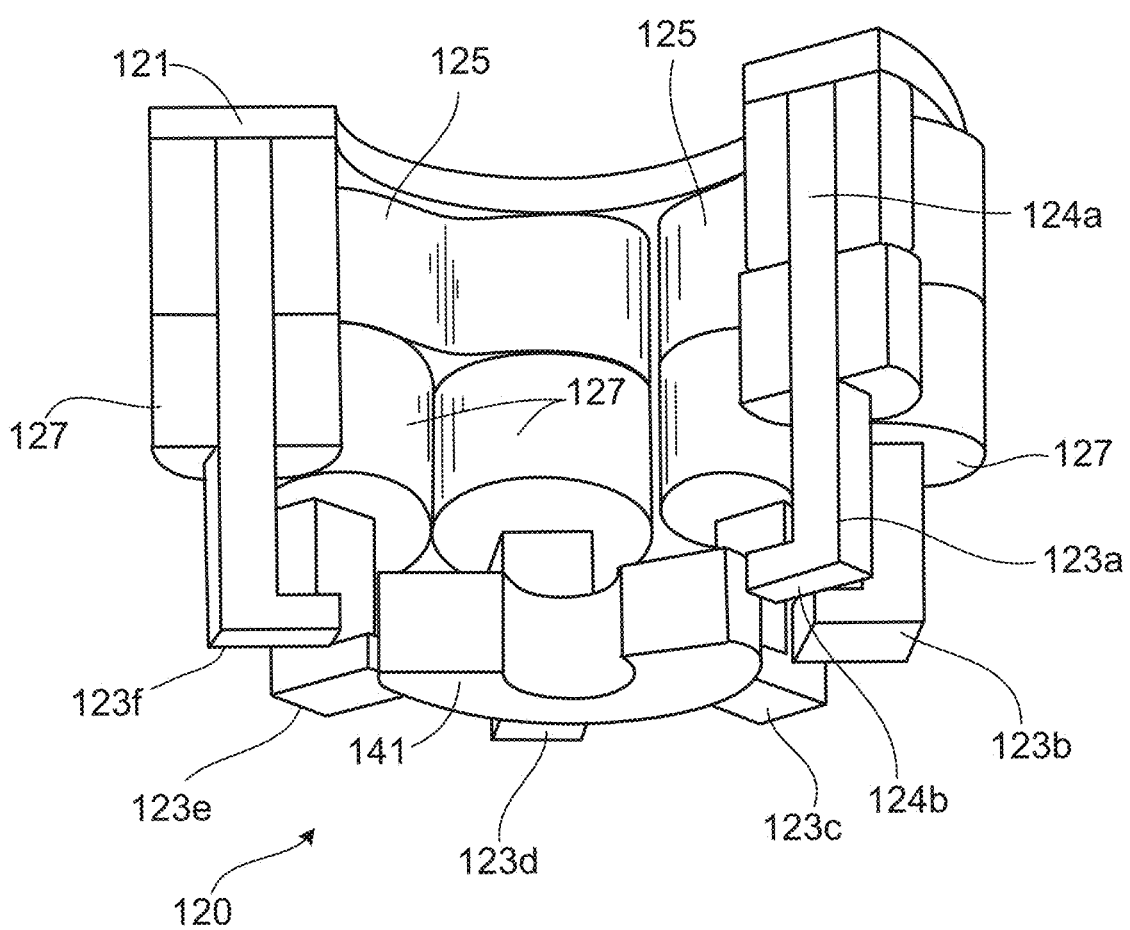
FIG. 9 is a partial cut-away perspective view of a stator of a blood pump.
Figure 10:
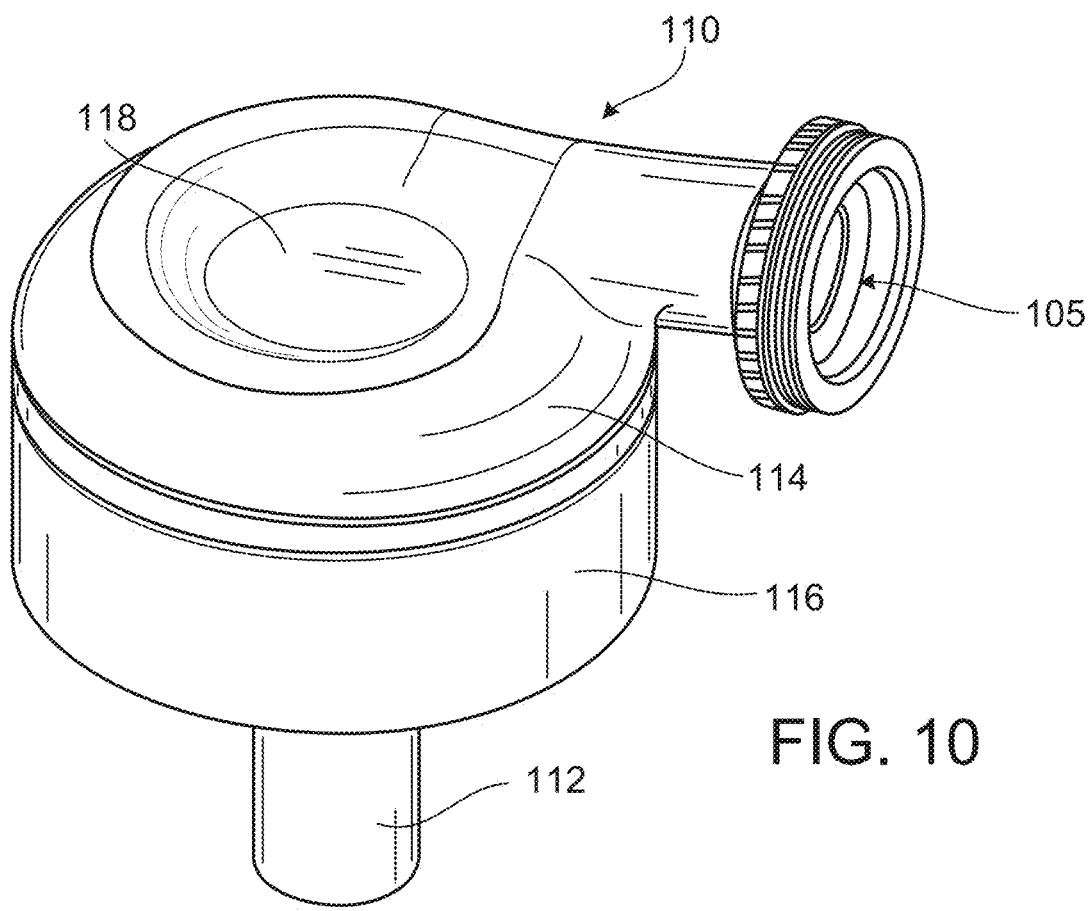
FIG. 10 is a bottom perspective view of a blood pump.
Figure 11:
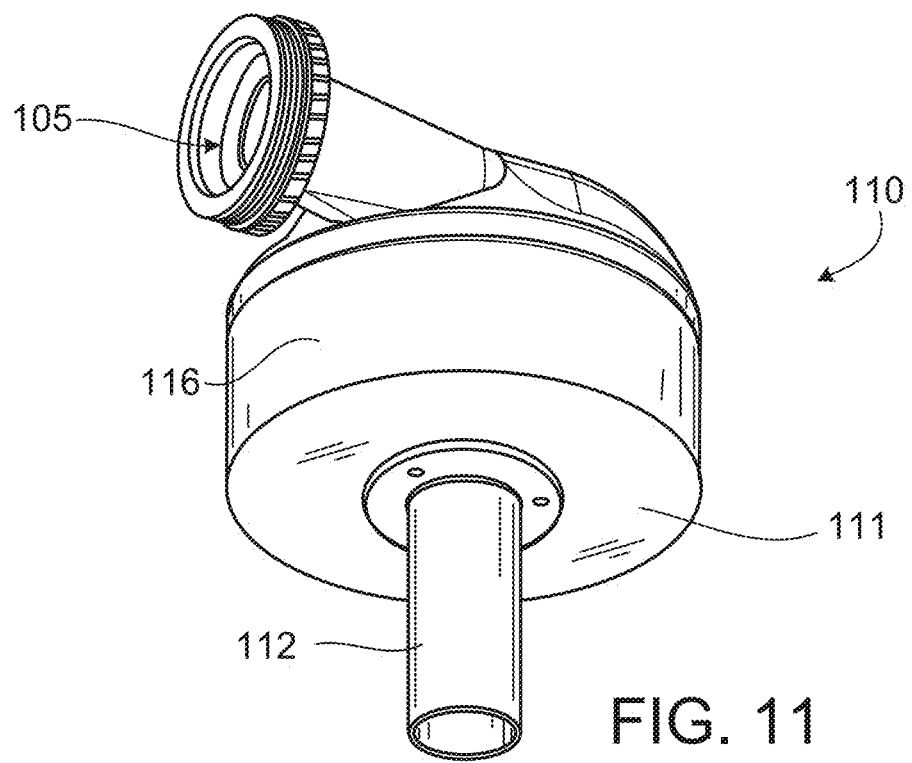
FIG. 11 is a top perspective view of the blood pump of FIG. 10.
Figure 12:
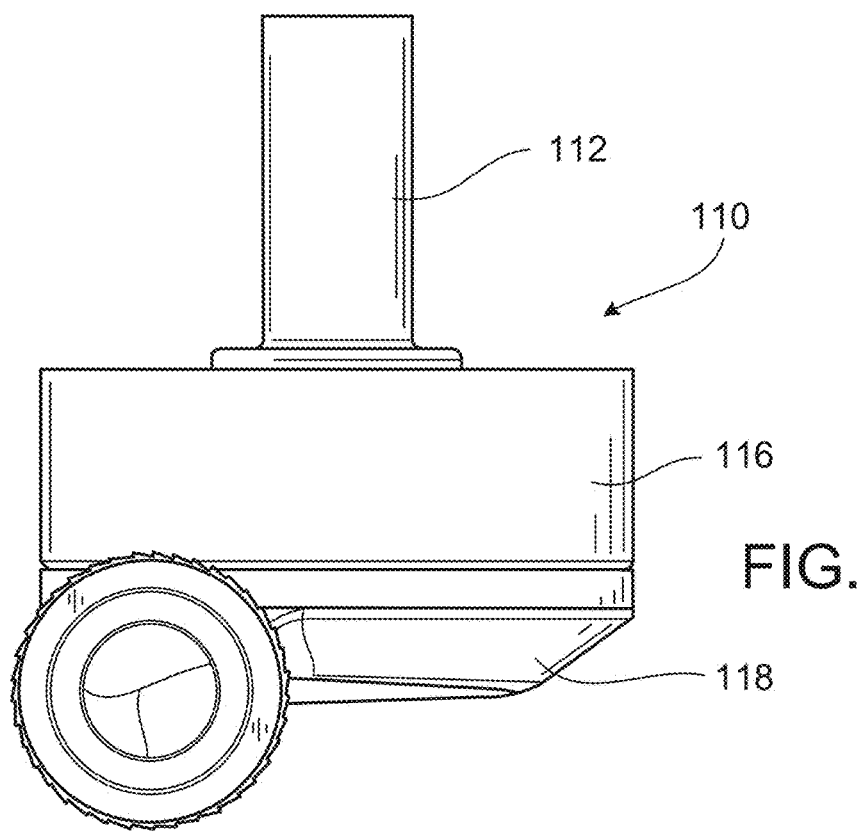
FIG. 12 is a front view of the blood pump of FIG. 10.
Figure 13:
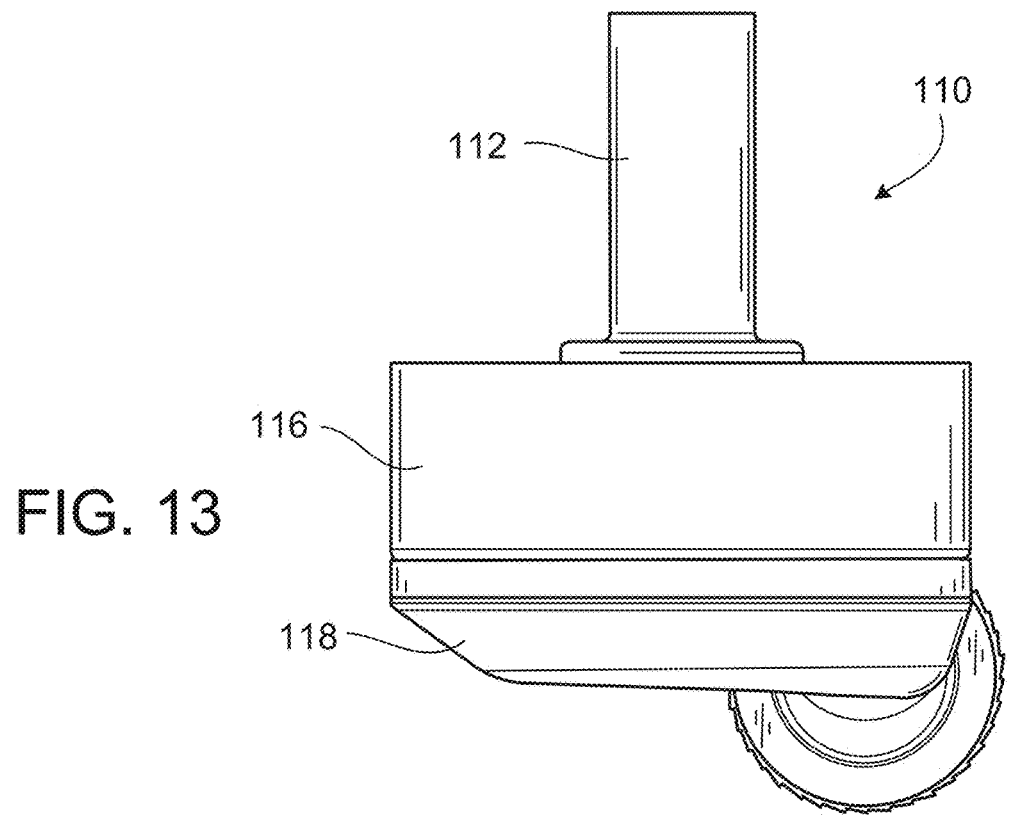
FIG. 13 is a back view of the blood pump of FIG. 10.
Figure 14:
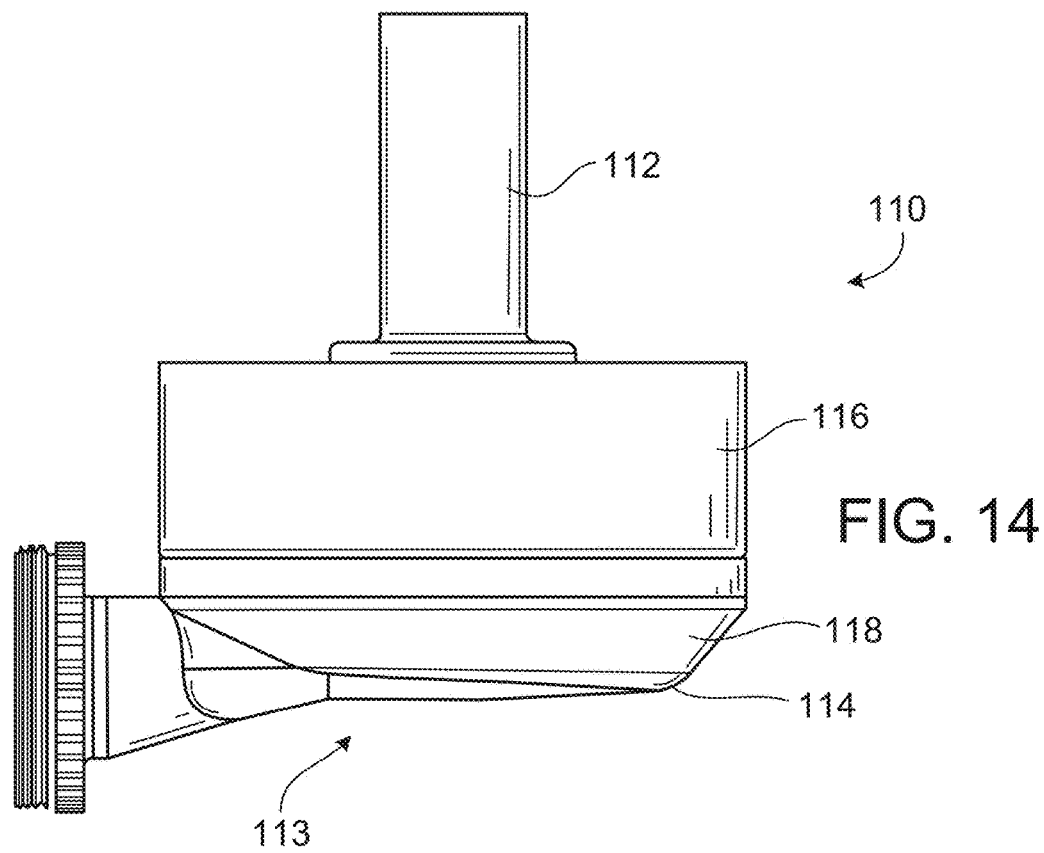
FIG. 14 is a right side view of the blood pump of FIG. 10.
Figure 15:
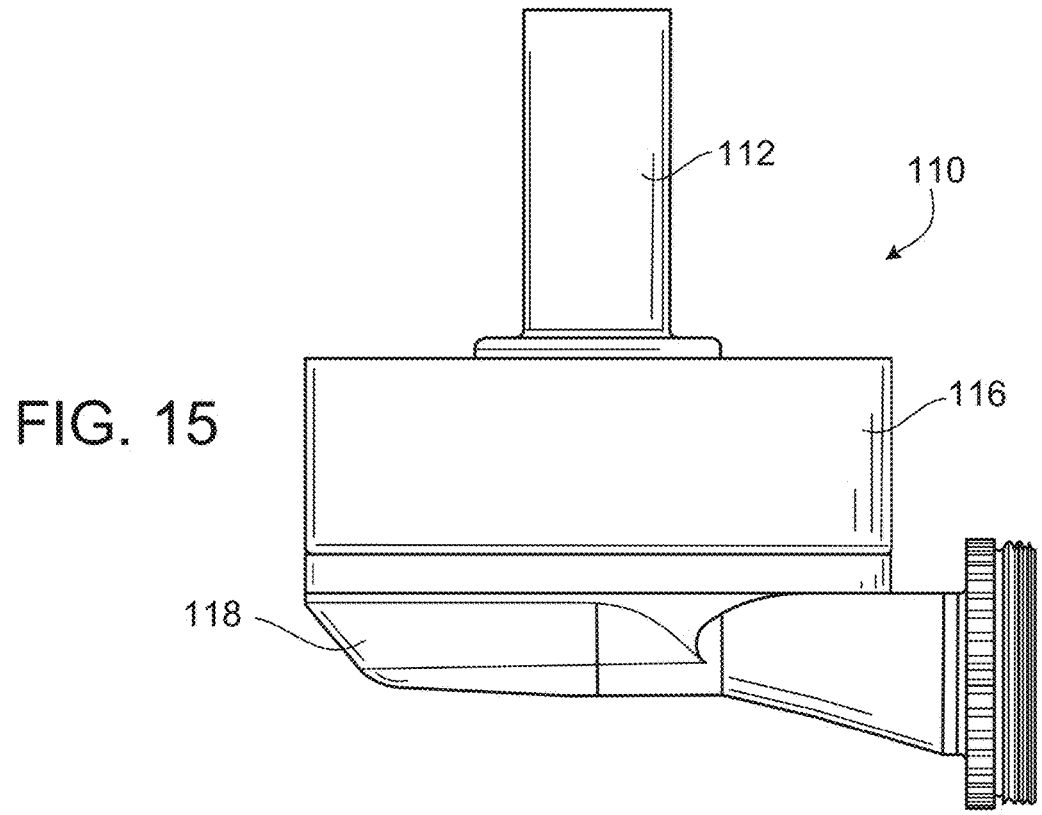
FIG. 15 is a left side view of the blood pump of FIG. 10.
Figure 16:
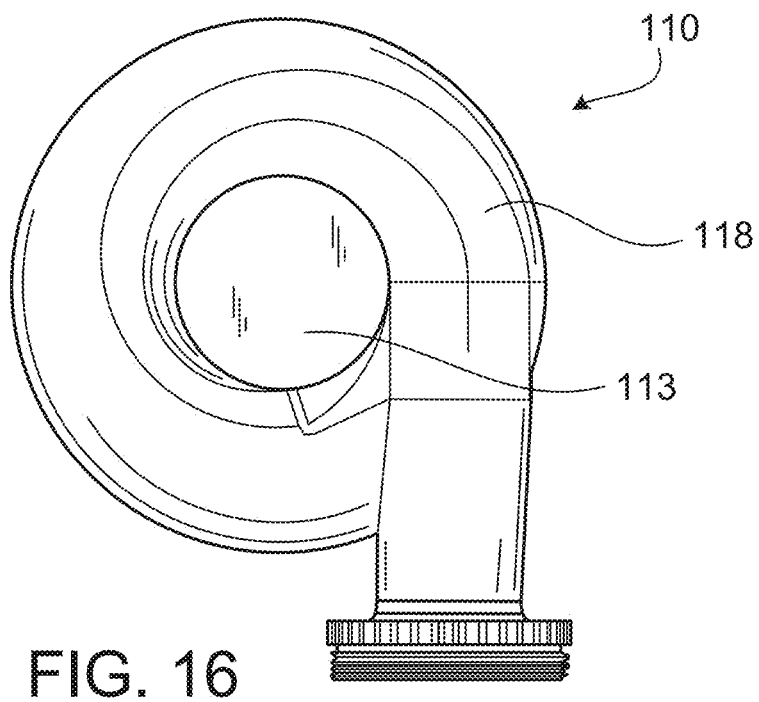
FIG. 16 is a bottom view of the blood pump of FIG. 10.
Figure 17:
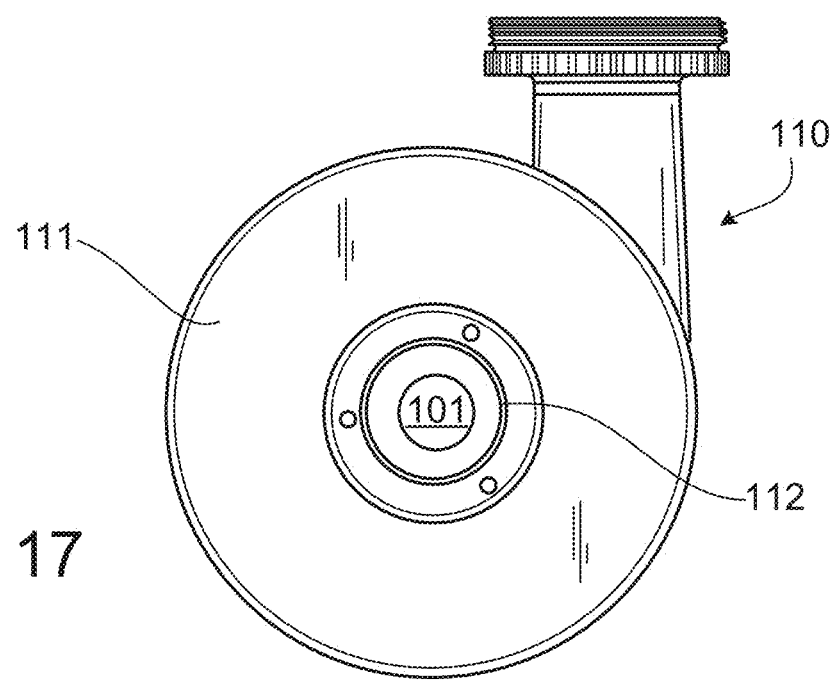
FIG. 17 is a top view of the blood pump of FIG. 10.

With continued reference to FIG. 8 and with reference to FIG. 9, the stator 120 includes a back iron 121 and pole pieces 123a-123f arranged at intervals around the dividing wall 115. The back iron 121 extends around the dividing wall 115 and is formed as a generally flat disc of a ferromagnetic material, such as steel, in order to conduct magnetic flux. The back iron 121 is arranged beside the control electronics 130 and provides a base for the pole pieces 123a-123f.

Each of the pole piece 123a-123f is L-shaped and has a drive coil 125 for generating an electromagnetic field to rotate the rotor 140. For example, the pole piece 123a has a first leg 124a that contacts the back iron 121 and extends from the back iron 121 towards the second face 113. The pole piece 123a also has a second leg 124b that extends from the first leg 124a towards the dividing wall 115 proximate the location of the permanent magnet 141 of the rotor 140. Each of the pole pieces 123a-123f also has a levitation coil 127 for generating an electromagnetic field to control the radial position of the rotor 140.

Figure 7:
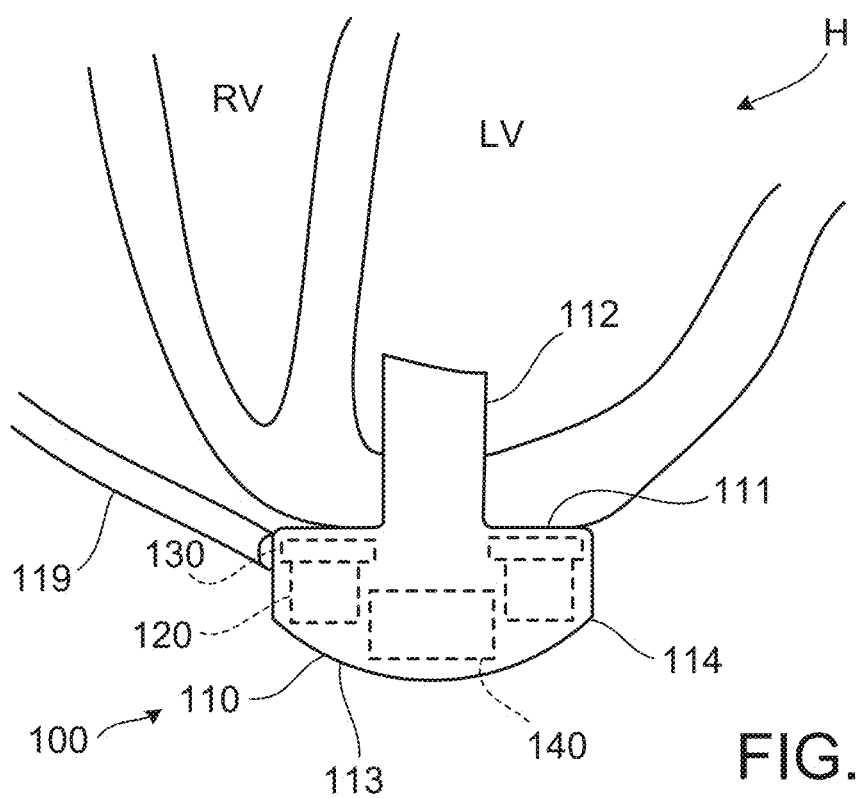
FIG. 7 is an illustration of a blood pump in a use position implanted in a patient's body.

Each of the drive coils 125 and the levitation coils 127 includes multiple windings of a conductor around the pole pieces 123a-123f. Particularly, each of the drive coils 125 is wound around two adjacent ones of the pole pieces 123, such as pole pieces 123d and 123e, and each levitation coil 127 is wound around a single pole piece. The drive coils 125 and the levitation coils 127 are wound around the first legs of the pole pieces 123, and magnetic flux generated by passing electrical current though the coils 125 and 127 during use is conducted through the first legs and the second legs of the pole pieces 123 and the back iron 121. The drive coils 125 and the levitation coils 127 of the stator 120 are arranged in opposing pairs and are controlled to drive the rotor and to radially levitate the rotor 140 by generating electromagnetic fields that interact with the permanent magnetic poles S and N of the permanent magnet 141. Because the stator 120 includes both the drive coils 125 and the levitation coils 127, only a single stator is needed to levitate the rotor 140 using only passive and active magnetic forces. The permanent magnet 141 in this configuration has only one magnetic moment and is formed from a monolithic permanent magnetic body 141. For example, the stator 120 can be controlled as discussed in U.S. Pat. No. 6,351,048, the entire contents of which are incorporated herein by reference. The control electronics 130 and the stator 120 receive electrical power from a remote power supply via a cable 119 (FIG. 7).

The rotor 140 is arranged within the housing 110 such that its permanent magnet 141 is located upstream of impeller blades in a location closer to the inlet opening 101. The permanent magnet 141 is received within the blood flow conduit 103 proximate the second legs 124b of the pole pieces 123 to provide the passive axial centering force though interaction of the permanent magnet 141 and ferromagnetic material of the pole pieces 123. The permanent magnet 141 of the rotor 140 and the dividing wall 115 form a gap 108 between the permanent magnet 141 and the dividing wall 115 when the rotor 140 is centered within the dividing wall 115. The gap 108 may be from about 0.2 millimeters to about 2 millimeters. For example, the gap 108 is approximately 1 millimeter. The north permanent magnetic pole N and the south permanent magnetic pole S of the permanent magnet 141 provide a permanent magnetic attractive force between the rotor 140 and the stator 120 that acts as a passive axial centering force that tends to maintain the rotor 140 generally centered within the stator 120 and tends to resist the rotor 140 from moving towards the first face 111 or towards the second face 113. When the gap 108 is smaller, the magnetic attractive force between the permanent magnet 141 and the stator 120 is greater, and the gap 108 is sized to allow the permanent magnet 141 to provide the passive magnetic axial centering force having a magnitude that is adequate to limit the rotor 140 from contacting the dividing wall 115 or the inner surface 118a of the cap 118. The rotor 140 also includes a shroud 145 that covers the ends of the impeller blades 143 facing the second face 113 that assists in directing blood flow into the volute 107. The shroud 145 and the inner surface 118a of the cap 118 form a gap 109 between the shroud 145 and the inner surface 118a when the rotor 140 is levitated by the stator 120. The gap 109 is from about 0.2 millimeters to about 2 millimeters. For example, the gap 109 is approximately 1 millimeter.

As blood flows through the blood flow conduit 103, blood flows through a central aperture 141a formed through the permanent magnet 141. Blood also flows through the gap 108 between the rotor 140 and the dividing wall 115 and through the gap 109 between the shroud 145 and the inner surface 108a of the cap 118. The gaps 108 and 109 are large enough to allow adequate blood flow to limit clot formation that may occur if the blood is allowed to become stagnant. The gaps 108 and 109 are also large enough to limit pressure forces on the blood cells such that the blood is not damaged when flowing through the pump 100. As a result of the size of the gaps 108 and 109 limiting pressure forces on the blood cells, the gaps 108 and 109 are too large to provide a meaningful hydrodynamic suspension effect. That is to say, the blood does not act as a bearing within the gaps 108 and 109, and the rotor is only magnetically-levitated.

Because the rotor 140 is radially suspended by active control of the levitation coils 127 as discussed above, and because the rotor 140 is axially suspended by passive interaction of the permanent magnet 141 and the stator 120, no rotor levitation components are needed proximate the second face 113. The incorporation of all the components for rotor levitation in the stator 120 (i.e., the levitation coils 127 and the pole pieces 123) allows the cap 118 to be contoured to the shape of the impeller blades 143 and the volute 107. Additionally, incorporation of all the rotor levitation components in the stator 120 eliminates the need for electrical connectors extending from the compartment 117 to the cap 118, which allows the cap to be easily installed and/or removed and eliminates potential sources of pump failure.

In use, the drive coils 125 of the stator 120 generates electromagnetic fields through the pole pieces 123 that selectively attract and repel the magnetic north pole N and the magnetic south pole S of the rotor 140 to cause the rotor 140 to rotate within stator 120. As the rotor 140 rotates, the impeller blades 143 force blood into the volute 107 such that blood is forced out of the outlet opening 105. Additionally, the rotor draws blood into pump 100 through the inlet opening 101. As blood is drawn into the blood pump by rotation of the impeller blades 143 of the rotor 140, the blood flows through the inlet opening 101 and flows through the control electronics 130 and the stator 120 toward the rotor 140. Blood flows through the aperture 141a of the permanent magnet 141 and between the impeller blades 143, the shroud 145, and the permanent magnet 141, and into the volute 107. Blood also flows around the rotor 140, through the gap 108 and through the gap 109 between the shroud 145 and the inner surface 118a of the cap 118. The blood exits the volute 107 through the outlet opening 105.

A number of implementations have been described. Nevertheless, it will be understood that various modifications may be made without departing from the spirit and scope of the claimed invention. For example, the cap 118 can be engaged with the peripheral wall 116 using a different attachment mechanism or technique, including snap-fit engagement, adhesives, or welding. Additionally, while the cap 118 has been described as defining the outlet opening 105 and the chamfered edge 114, the outlet opening 105 and/or the chamfered edge 114 can be defined by the peripheral wall 116 or by both the peripheral wall 116 and the cap 118. Similarly, the dividing wall 115 can be formed as part of the cap 118.

Additionally, the rotor 140 can include two or more permanent magnets. The number and configuration of the pole pieces 123 can also be varied. The operation of the control electronics 130 is selected to account for the number and position of pole pieces of the stator and permanent magnets of the rotor. Also, the cap 118 can be engaged with the peripheral wall using other techniques, such as adhesives, welding, snap-fit, shrink-fit, or other technique or structure. Similarly, the first face 111 may be formed from a separate piece of material than the peripheral wall 116 and the first face 111, including the inlet cannula 112, can be attached to the peripheral wall 116, such as by welding, after the control electronics 130 and the stator 120 have been mounted in the internal compartment 117. The shroud 145 may be omitted and optionally replaced by other flow control devices to achieve a desired pump efficiency. As another option, the control electronics 130 can be located external to the pump 100, such as in a separate housing implanted in the patient's abdomen, or external to the patient's body.

In some implementations, the dimensions of the housing 110 can be larger or smaller than those described above. Similarly, the ratio of the width W of the housing 110 to the thickness T of the housing can be different than the ratio described above. For example, the width W can be from about 1.1 to about 5 times greater than the thickness T. Additionally, the permanent magnet 141 of the rotor 140 can include two or more pairs of north and south magnetic poles. While the peripheral wall 116 and the dividing wall 115 are illustrated as cylinders having circular cross-sectional shapes, one or both can alternatively be formed having other cross-sectional shapes, such as oval, or an irregular shape. Similarly, the peripheral wall 116 can be tapered such that the housing does not have a constant width W from the first face 111 to the second face 113.

As mentioned above, in some implementations, the blood pump 100 can be used to assist a patient's heart during a transition period, such as during a recovery from illness and/or surgery or other treatment. In other implementations, the blood pump 100 can be used to partially or completely replace the function of the patient's heart on a generally permanent basis, such as where the patient's aortic valve is surgically sealed.

Accordingly, other embodiments are within the scope of the following claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A mechanical circulatory support system comprising:
   a ventricular cuff configured for attachment to a heart of a user;
   a ventricular assist device configured for attachment to the ventricular cuff, wherein the ventricular assist device comprises a housing, a rotor, a stator assembly, and control electronics, wherein the housing defines an inlet opening and an outlet opening, wherein the housing comprises a dividing wall that delineates an inner volume that fluidly connects the inlet opening and the outlet opening, wherein the rotor is disposed within the inner volume and comprises one or more permanent magnets and centrifugal impeller blades, wherein each of the one or more permanent magnets comprises a permanent north pole and a permanent south pole, wherein the centrifugal impeller blades are configured to pump blood from the inlet opening to the outlet opening during rotation of the rotor within the inner volume, wherein the rotor and the inner volume are sized for complete magnetic levitation of the rotor within the inner volume so that blood flows through a secondary blood flow path between the rotor and the dividing wall having a secondary blood flow path gap in a range from 0.2 mm to 2.0 mm, wherein the stator assembly comprises drive coils and levitation coils, wherein the drive coils are arranged radially relative to the rotor, wherein the drive coils are operable to electromagnetically drive rotation of the rotor within the inner volume, wherein the levitation coils are arranged radially relative to the rotor, wherein the levitation coils are operable to electromagnetically levitate the rotor to control a radial position of the rotor within the inner volume, and wherein the control electronics are disposed within the housing and configured to control electrical supply to the drive coils and the levitation coils;
   an external module comprising an internal battery, wherein the external module is configured to power and control operation of the mechanical circulatory support system; and
   a connector cable over which power and data is transmitted from the external module to the ventricular assist device, wherein the connector cable comprises two redundant pairs of electrical conductors.

2. The mechanical circulatory support system of claim 1, wherein the data comprises a connection signal indicative of connection of the connector cable with an input connector operatively coupled with the ventricular assist device.

3. The mechanical circulatory support system of claim 1, wherein the two redundant pairs of electrical conductors consist of two power conductors and two ground conductors.

4. The mechanical circulatory support system of claim 3, wherein the two pairs of redundant electrical conductors are arranged in a linear array within the connector cable so that the connector cable has an elongated cross section.

5. The mechanical circulatory support system of claim 4, wherein:
the connector cable comprises a connector cable output connector;
the connector cable output connector comprises two power connectors, two ground connectors, and a data connector; and
the two power connectors and the two ground connectors are arranged symmetrically on opposite sides of the data connector to enable coupling of the connector cable output connector to an input connector in each of two opposite orientations.

6. The mechanical circulatory support system of claim 5, wherein the connector cable comprises an optical fiber connected to the data connector.

7. The mechanical circulatory support system of claim 1, further comprising an input connector, and wherein:
the connector cable comprises a connector cable output connector;
the connector cable output connector comprises four connectors;
the four connectors of the connector cable output connector comprise spring-loaded metal pins;
the input connector comprises metal plates; and
each of the metal plates is engaged by a respective one of the spring-loaded metal pins.

8. The mechanical circulatory support system of claim 1, further comprising an input connector, and wherein:
the connector cable comprises a connector cable output connector;
the connector cable output connector comprises a latching mechanism configured to physically attach the connector cable output connector to the input connector.

9. The mechanical circulatory support system of claim 8, wherein:
the latching mechanism comprises two latching arms; and
each of the latching arms comprises a dimple of a complementary shape and size to a respective recess on a surface of the ventricular assist device.

10. The mechanical circulatory support system of claim 8, wherein the latching mechanism comprises a first magnetic element configured to latch to a second magnetic element mounted to the ventricular assist device.

11. The mechanical circulatory support system of claim 10, wherein the first magnetic element is configured to unlatch from the second magnetic element upon application of a particular breakaway force.

12. The mechanical circulatory support system of claim 1, wherein the external module comprises an external module input connector configured to receive electrical power from a battery module and/or a charging unit.

13. The mechanical circulatory support system of claim 12, further comprising a battery module connector cable connected with the battery module and the external module input connector.

14. The mechanical circulatory support system of claim 13, wherein:
the battery module comprises a battery module output connector; and
the battery module connector cable comprises a battery module connector cable input connector that is couplable with the battery module output connector and decouplable from the battery module output connector.

15. The mechanical circulatory support system of claim 1, wherein the external module is configured to control distribution of electrical power received by the external module to simultaneously charge the internal battery and output electrical power to the ventricular assist device.

16. The mechanical circulatory support system of claim 1, wherein:
the housing has a puck-shaped portion and an inlet-cannula portion that extends from the puck-shaped portion; and
the puck-shaped portion has a width to thickness ratio in a range from 1.1 to 5.

17. The mechanical circulatory support system of claim 1, wherein the one or more permanent magnets provide a passive magnetic attractive force between the rotor and the stator assembly that resists movement of the rotor along an axis of rotation of the rotor.

18. A mechanical circulatory support system comprising:
a ventricular cuff configured for attachment to a heart of a user;
a ventricular assist device configured for attachment to the ventricular cuff, wherein the ventricular assist device comprises a housing, a rotor, a stator assembly, and control electronics, wherein the housing defines an inlet opening and an outlet opening, wherein the housing comprises a dividing wall that delineates an inner volume that fluidly connects the inlet opening and the outlet opening, wherein the rotor is disposed within the inner volume and comprises one or more permanent magnets and centrifugal impeller blades, wherein each of the one or more permanent magnets comprises a permanent north pole and a permanent south pole, wherein the centrifugal impeller blades are configured to pump blood from the inlet opening to the outlet opening during rotation of the rotor within the inner volume, wherein the rotor and the inner volume are sized for complete magnetic levitation of the rotor within the inner volume so that blood flows through a secondary blood flow path between the rotor and the dividing wall having a secondary blood flow path gap in a range from 0.2 mm to 2.0 mm, wherein the stator assembly comprises drive coils and levitation coils, wherein the drive coils are arranged radially relative to the rotor, wherein the drive coils are operable to electromagnetically drive rotation of the rotor within the inner volume, wherein the levitation coils are arranged radially relative to the rotor, wherein the levitation coils are operable to electromagnetically levitate the rotor to control a radial position of the rotor within the inner volume, and wherein the control electronics are disposed within the housing and configured to control electrical supply to the drive coils and the levitation coils;
a ventricular assist device input connector operatively coupled with the ventricular assist device;
an external module comprising one or more battery cells; and
a connector cable configured to operatively couple the external module to the ventricular assist device input connector, wherein the connector cable comprises a connector cable output connector and at least four connectors configured to transfer power from the one or more battery cells of the external module to the ventricular assist device input connector for powering the ventricular assist device and to transfer data between the ventricular assist device and the external module.

19. The mechanical circulatory support system of claim 18, wherein the data comprises a connection signal indicative of connection of the connector cable with the ventricular assist device input connector.

20. The mechanical circulatory support system of claim 18, wherein the at least four connectors comprise two power conductors and two ground conductors.

21. The mechanical circulatory support system of claim 20, wherein the two power conductors and the two ground conductors are arranged in a linear array within the connector cable so that the connector cable has an elongated cross section.

22. The mechanical circulatory support system of claim 18, wherein:
the connector cable output connector comprises two power connectors, two ground connectors, and a data connector; and
the two power connectors and the two ground connectors are arranged symmetrically on opposite sides of the data connector to enable coupling of the connector cable output connector to the ventricular assist device input connector in each of two opposite orientations.

23. The mechanical circulatory support system of claim 22, wherein the at least four connectors comprise an optical fiber connected to the data connector.

24. The mechanical circulatory support system of claim 18, wherein:
the connector cable output connector comprises spring-loaded metal pins;
the ventricular assist device input connector comprises metal plates; and
each of the metal plates is engaged by a respective one of the spring-loaded metal pins.

25. The mechanical circulatory support system of claim 18, wherein the connector cable output connector comprises a latching mechanism configured to physically attach the connector cable output connector to the ventricular assist device input connector.

26. The mechanical circulatory support system of claim 25, wherein:
the latching mechanism comprises two latching arms; and
each of the latching arms comprises a dimple of a complementary shape and size to a respective recess on a surface of the ventricular assist device.

27. The mechanical circulatory support system of claim 25, wherein the latching mechanism comprises a first magnetic element configured to latch to a second magnetic element mounted to the ventricular assist device.

28. The mechanical circulatory support system of claim 27, wherein the first magnetic element is configured to unlatch from the second magnetic element upon application of a particular breakaway force.

29. The mechanical circulatory support system of claim 18, wherein:
the housing has a puck-shaped portion and an inlet-cannula portion that extends from the puck-shaped portion; and
the puck-shaped portion has a width to thickness ratio in a range from 1.1 to 5.

30. The mechanical circulatory support system of claim 18, wherein the one or more permanent magnets provide a passive magnetic attractive force between the rotor and the stator assembly that resists movement of the rotor along an axis of rotation of the rotor.

* * * * *